United States Patent
Kang et al.

(10) Patent No.: US 11,219,006 B2
(45) Date of Patent: Jan. 4, 2022

(54) METHOD FOR TRANSMITTING AND RECEIVING UPLINK CHANNEL IN WIRELESS COMMUNICATION SYSTEM AND DEVICE THEREFOR

(71) Applicant: LG Electronics Inc., Seoul (KR)

(72) Inventors: Jiwon Kang, Seoul (KR); Kijun Kim, Seoul (KR); Hyungtae Kim, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 61 days.

(21) Appl. No.: 16/621,625

(22) PCT Filed: Jun. 11, 2018

(86) PCT No.: PCT/KR2018/006610
§ 371 (c)(1),
(2) Date: Dec. 11, 2019

(87) PCT Pub. No.: WO2018/230911
PCT Pub. Date: Dec. 20, 2018

(65) Prior Publication Data
US 2020/0178220 A1    Jun. 4, 2020

Related U.S. Application Data

(60) Provisional application No. 62/517,981, filed on Jun. 11, 2017.

(51) Int. Cl.
*H04B 7/0456* (2017.01)
*H04L 1/00* (2006.01)
(Continued)

(52) U.S. Cl.
CPC ......... *H04W 72/042* (2013.01); *H04L 5/0053* (2013.01)

(58) Field of Classification Search
CPC .......... H04W 72/042; H04W 24/10; H04L 5/0053; H04B 7/0469; H04B 7/0695; H04B 7/088; H04B 7/0478
See application file for complete search history.

(56) References Cited

U.S. PATENT DOCUMENTS

| | | | |
|---|---|---|---|
| 9,510,331 B2 * | 11/2016 | Rune | H04W 52/0209 |
| 9,510,332 B2 * | 11/2016 | Park | H04L 1/1812 |
| 2013/0182789 A1 * | 7/2013 | Ko | H04B 7/0626 375/267 |

(Continued)

FOREIGN PATENT DOCUMENTS

| | | |
|---|---|---|
| EP | 3157282 | 4/2017 |
| JP | 2012530470 | 11/2012 |
| JP | 2015534764 | 12/2015 |

(Continued)

OTHER PUBLICATIONS

IN Office Action in Indian Appln. No. 201927051608, dated Mar. 2, 2021, 9 pages (with English translation).

(Continued)

*Primary Examiner* — Diane L Lo
*Assistant Examiner* — Abusayeed M Haque
(74) *Attorney, Agent, or Firm* — Fish & Richardson P.C.

(57) ABSTRACT

The present specification provides a method for transmitting and receiving an uplink channel in a wireless communication system, and a device therefor. Particularly, a method for transmitting an uplink channel by a terminal in a wireless communication system can comprise the steps of: receiving, from a base station, information indicating a first timing offset for channel state information (CSI) reporting and/or a second timing offset for transmitting uplink data; and transmitting an uplink data channel to the base station in a resource region configured in accordance with a specific timing offset value. The specific timing offset value can be (Continued)

set by applying the first timing offset and/or the second timing offset in accordance with the type of information allocated to the uplink data channel.

13 Claims, 10 Drawing Sheets

(51) Int. Cl.
    *H04B 7/06*     (2006.01)
    *H04B 7/08*     (2006.01)
    *H04W 72/04*     (2009.01)
    *H04L 5/00*     (2006.01)

(56) References Cited

U.S. PATENT DOCUMENTS

| | | | |
|---|---|---|---|
| 2013/0294352 A1 | 11/2013 | Park et al. | |
| 2014/0079149 A1 | 3/2014 | Lee et al. | |
| 2014/0241298 A1 | 8/2014 | Park et al. | |
| 2014/0269460 A1* | 9/2014 | Papasakellariou | H04L 5/0048 370/294 |
| 2018/0091992 A1* | 3/2018 | Frenne | H04L 5/0048 |
| 2018/0124749 A1* | 5/2018 | Park | H04W 74/08 |
| 2019/0045505 A1* | 2/2019 | Yang | H04W 72/0446 |
| 2019/0132099 A1* | 5/2019 | Wu | H04L 5/0048 |
| 2019/0149306 A1* | 5/2019 | Gao | H04L 5/0023 370/252 |
| 2019/0327066 A1* | 10/2019 | Gao | H04L 1/1854 |

FOREIGN PATENT DOCUMENTS

| | | |
|---|---|---|
| KR | 20140036137 | 3/2014 |
| WO | WO2014097358 | 6/2014 |
| WO | WO2015093910 | 6/2015 |

OTHER PUBLICATIONS

Qualcomm Incorporated, "CR on correction to the PUSCH start position reference and relative timing offset in UL DCI for LAA," R1-1613134, 3GPP TSG-RAN Meeting #87, Reno, USA, dated Nov. 10-14, 2016, 7 pages.
Ericsson, On CSI measurements and reporting, R1-1612349, 3GPP TSG-RAN WG1 #87, Reno, Nevada, Nov. 14-18, 2016, 4 pages.
Extended European Search Report in European Appln. No. 18817936.0, dated Jul. 7, 2020, 12 pages.
Huawei, HiSilico, Independent and joint control of CSI-RS transmission and CSI reporting for NR MIMO, R1-1701681, 3GPP TSG RAN WG1 #88 Meeting Athens, Greece, Feb. 13-17, 2017, 7 pages.
Huawei, HiSilico, On the need for more flexible configurations related to CSI reporting, R1-1611237, 3GPP TSG RAN WG1 Meeting #87, Reno, USA, Nov. 14-18, 2016, 6 pages.
LG Electronics, Discussion on CSI timing, R1-1700473, 3GPP TSG RAN WG1 NR Ad-Hoc Meeting, Spokane, USA, Jan. 16-20, 2017, 5 pages.
Samsung, Discussion on periodic and semi-persistent CSI reporting for NR, R1-1702944, 3GPP TSG RAN WG1 Meeting #88, Athens, Greece Feb. 13-17, 2017, 6 pages.
European Office Action in European Appln. No. 18817936.0, dated May 7, 2021, 9 pages.
Huawei, HiSilicon, "DCI contents in NR and two-stage DCI designs," R1-1706949, 3GPP TSG RAN WG1 Meeting #89, Hangzhou, China, May 15-19, 2017, 6 pages.
Samsung, "On UCI Multiplexing in PUSCH," R1-1705393, 3GPP TSG RAN WG1 #88bis, Spokane, USA, Apr. 3-7, 2017, 4 pages.
JP Office Action in Japanese Appln. No. 2019-568384, dated Mar. 23, 2021, 6 pages (with English translation).

* cited by examiner (a)

(b)

METHOD FOR TRANSMITTING AND RECEIVING UPLINK CHANNEL IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2018/006610, filed on Jun. 11, 2018, which claims the benefit of U.S. Provisional Application No. 62/517,981, filed on Jun. 11, 2017. The disclosures of the prior applications are incorporated by reference in their entirety.

TECHNICAL FIELD

The disclosure relates to a wireless communication system, and more specifically, to a method for transmitting/receiving an uplink channel and apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DETAILED DESCRIPTION OF THE INVENTION

Technical Problem

According to the disclosure, there are proposed a method of transmitting/receiving an uplink channel in a wireless communication system and apparatus for the same.

In connection, according to the disclosure, there are proposed a method of transmitting an uplink channel considering a computation time for a UE's channel state information (CSI) report and uplink data and apparatus for the same.

Specifically, according to the disclosure, there are proposed a method of transmitting a CSI report and/or UL data via an uplink data channel considering a timing offset related to the CSI report and/or a timing offset related to the uplink data and apparatus for the same.

The technical objects of the present disclosure are not limited to the aforementioned technical objects, and other technical objects, which are not mentioned above, will be apparently appreciated by a person having ordinary skill in the art from the following description.

Technical Solution

According to an embodiment of the disclosure, a method of transmitting an uplink channel by a user equipment (UE) in a wireless communication system may comprise receiving information indicating at least one of a first timing offset for channel state information (CSI) reporting and a second timing offset for transmission of uplink data from a base station and transmitting an uplink data channel to the base station in a resource region configured according to a specific timing offset value. At this time, the specific timing offset value may be configured by applying at least one of the first timing offset and the second timing offset, according to a type of information allocated to the uplink data channel.

Further, according to an embodiment of the disclosure, in the method, the type of the information allocated to the uplink data channel may be divided into a first type in which the CSI reporting is allocated, a second type in which the CSI reporting and the uplink data are allocated, and a third type in which the uplink data is allocated. At this time, a minimum timing offset value for transmission of the uplink data channel may be configured or defined for each type.

In particular, when the CSI reporting and the uplink data are allocated to the uplink data channel, the minimum timing offset value may be determined by adding a specific value to a minimum timing offset value for the first type.

At this time, when the specific timing offset value is configured to be smaller than the minimum timing offset value, the CSI reporting may not be performed via the uplink data channel. Or, when the specific timing offset value is smaller than the minimum timing offset value and is larger than a minimum timing offset value for the third type, only the uplink data may be transferred via the uplink data channel. Or, when the specific timing offset value is smaller than the minimum timing offset value, a CSI previously reported by the UE may be transferred via the uplink data channel.

Further, according to an embodiment of the disclosure, in the method, the first timing offset and the second timing offset may be indicated in the same field of downlink control information. In this case, a code point of the field may indicate one of candidate values for the first timing offset or one of candidate values for the second timing offset depending on the type of the information allocated to the uplink data channel. At this time, each of the candidate values for the first timing offset and the candidate values for the second timing offset may be configured via higher layer signaling. For example, when the CSI reporting and the uplink data are allocated to the uplink data channel, the code point of the field may be mapped to one of the candidate values for the first timing offset or one of the candidate values for the second timing offset.

Further, according to an embodiment of the disclosure, in the method, the first timing offset may be configured via higher layer signaling, and the second timing offset may be indicated by downlink control information.

At this time, when triggering of the CSI reporting and resource allocation of the uplink data channel are simultaneously indicated, and a range indicated by the second timing offset is included in a range indicated by the first timing offset, the uplink data channel may transfer the CSI reporting and the uplink data. Or, when triggering of the CSI reporting and resource allocation of the uplink data channel are simultaneously indicated, and a range indicated by the second timing offset is not included in a range indicated by the first timing offset, the uplink data channel may transfer the uplink data.

Further, according to an embodiment of the disclosure, in the method, the CSI reporting may be configured to be performed aperiodically by a triggering indication.

According to an embodiment of the disclosure, a user equipment (UE) transmitting an uplink channel in a wireless communication system comprises a radio frequency (RF) module for transmitting/receiving a radio signal and a processor functionally connected with the RF module. The processor may perform control to receive information indicating at least one of a first timing offset for channel state information (CSI) reporting and a second timing offset for transmission of uplink data from a base station and transmit an uplink data channel to the base station in a resource region configured according to a specific timing offset value. The specific timing offset value may be configured by applying at least one of the first timing offset and the second timing offset, according to a type of information allocated to the uplink data channel.

Advantageous Effects

According to the embodiments of the disclosure, it is possible to secure a computation time required for CSI reporting when a UE receives an indication or allocation of CSI reporting.

Further, according to the embodiments of the disclosure, it is possible to reduce the UE's blind decoding overhead since the timing offsets of a CSI report and uplink data transmissions are indicated using the same downlink control information (or the same downlink control information field).

Advantages which may be obtained in the present disclosure are not limited to the aforementioned effects and other unmentioned advantages will be clearly understood by those skilled in the art from the following description.

BRIEF DESCRIPTION OF THE DRAWINGS

The accompanying drawings, which are included herein as a part of a description in order to help understanding of the present disclosure, provide embodiments of the present disclosure, and describe the technical features of the present disclosure with the description below.

MODE FOR CARRYING OUT THE INVENTION

Figure 1:
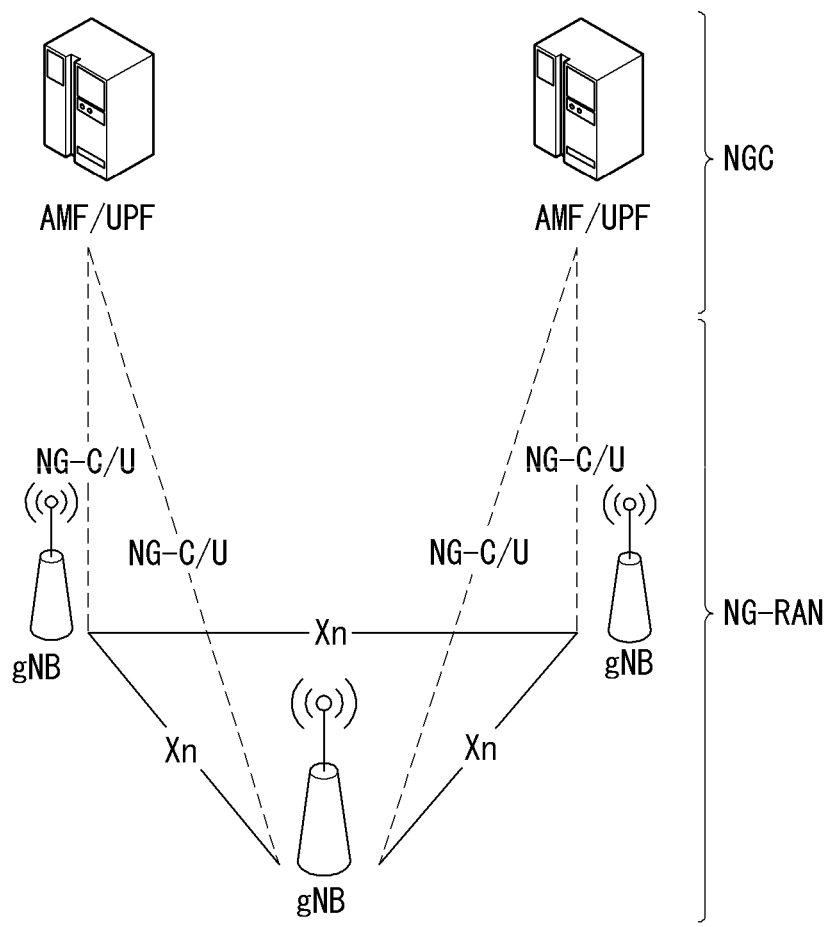
FIG. 1 illustrates an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A "base station (BS)" may be replaced with a term, such as a fixed station, a Node B, an evolved-NodeB (eNB), a base transceiver system (BTS), an access point (AP), a next generation NB, a general NB or a gNodeB (gNB). Further, a "terminal" may be fixed or mobile and may be replaced with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.

Overview of System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In the embodiments of the present disclosure, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB. In relation to a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes, each one having a section of $T_{sf}=(\Delta f_{max} N_f/1000) \cdot T_s=1$ ms. In this case, there may be a set of UL frames and a set of DL frames.

Figure 2:
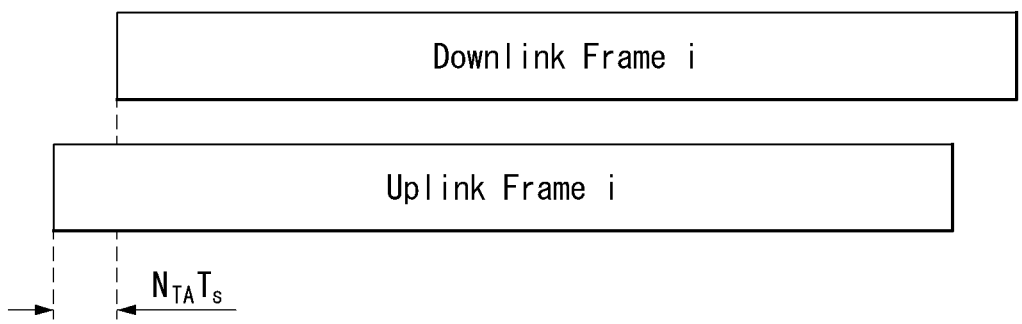
FIG. 2 illustrates a relationship between an uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

In relation to the numerology μ, slots are numbered in ascending order of $n_s^{\mu} \in \{0, \ldots, N_{subframe}^{slots,\mu}-1\}$ in a subframe, and in ascending order of $n_{s,f}^{\mu} \in \{0, \ldots, N_{subframe}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

TABLE 2

| | Slot configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In relation to physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
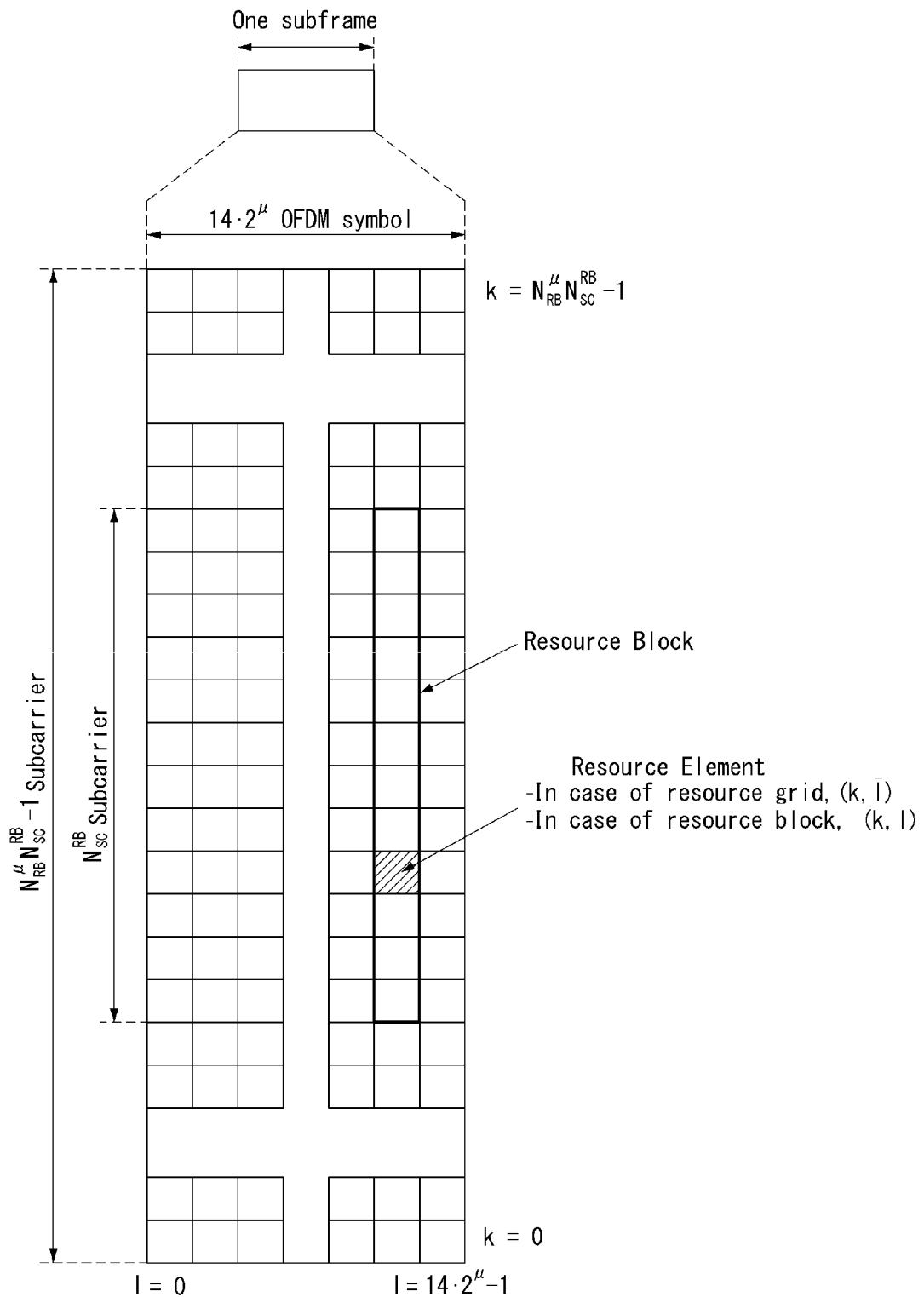
FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of 14.2$\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols. Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

Figure 4:
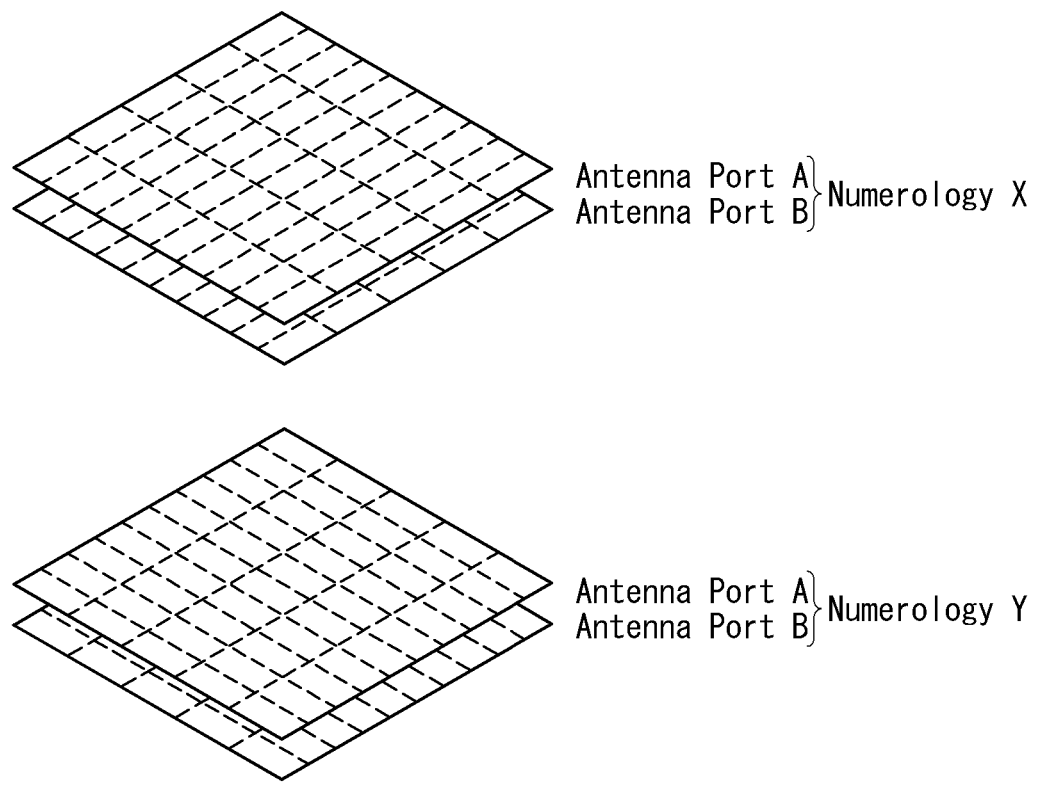
FIG. 4 illustrates examples of resource grids for each antenna port and numerology to which a method proposed in this specification may be applied.

In this case, as illustrated in FIG. 4, one resource grid may be configured for the numerology $\mu$ and an antenna port p.

FIG. 4 shows an example of antenna ports and ringer-specific resource grids to which the method proposed herein may be applied.

Each element of the resource grid for the numerology $\mu$ and the antenna port p is indicated as a resource element, and may be uniquely identified by an index pair (k,l̄). Herein, $k=0, \ldots, N_{RB}^\mu N_{sc}^{RB}-1$ is an index in the frequency domain, and $\bar{l}=0 \ldots 2^\mu N_{symb}^{(\mu)}-1$ indicates a location of a symbol in a subframe. To indicate a resource element in a slot, the index pair (k,l̄) is used. Herein, $l=0, \ldots, N_{symb}^\mu-1$.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{a,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^\mu-1$ in the frequency region.

Beam Management

In NR, beam management is defined as follows.

Beam management: A set of L1/L2 procedures for obtaining and maintaining a set of TRP(s) and/or UE beams that may be used for DL and UL transmission/reception, including at least:

Beam determination: operation of the TRP(s) or the UE selecting transmission/reception beam thereof.

Beam measurement: operation of the TRP(s) or the UE selecting transmission/reception beam thereof.

Beam reporting: operation in which the UE reports information of a beamformed signal based on beam measurement.

Beam sweeping: operation of covering a spatial region using a transmitted and/or received beam for a time interval in a predetermined scheme.

Further, Tx/Rx beam correspondence between a TRP and a UE is defined as follows:

The Tx/Rx beam correspondence in the TRP is maintained if at least one of the followings is satisfied:

The TRP may determine a TRP reception beam for uplink reception based on the UE's downlink measurement for one or more transmission beams of the TRP.

The TRP may determine a TRP Tx beam for downlink reception based on uplink measurement of the TRP for one or more Rx beams of the TRP.

The Tx/Rx beam correspondence in the UE is maintained if at least one of the followings is satisfied:

The UE may determine a UE Tx beam for uplink transmission based on downlink measurement of the UE for one or more Rx beams of the UE.

The UE may determine a UE reception beam for downlink reception based on an instruction of the TRP based on uplink measurement for one or more Tx beams.

A capability indication of UE beam correspondence related information is supported to the TRP.

The following DL L1/L2 beam management procedures are supported within one or more TRPs.

P-1: Used to enable UE measurement for different TRP Tx beams to support selection of TRP Tx beam/UE Rx beam(s).

For beamforming in the TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. In this case, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≤1 reporting setting and M≤1 resource setting

Links between reporting settings and resource settings are set in agreed CSI measurement settings.

CSI-RS-based P-1 and P-2 are supported with the resource and reporting settings.

P-3 may be supported with or without the reporting settings.

Reporting setting that includes at least:

Information indicating the selected beam

L1 measurement reporting

Time domain operation (e.g., aperiodic operation, periodic operation, semi-persistent operation)

Frequency granularity when multiple frequency granularities are supported

Resource setting that includes at least:

Time domain operation (e.g., aperiodic operation, periodic operation, semi-persistent operation)

RS type: at least NZP CSI-RS

At least one CSI-RS resource set. Each CSI-RS resource set includes K≤1 CSI-RS resources (Some parameters of K CSI-RS resources may be the same. For example, port number, a time domain operation, density, and periodicity).

Further, NR supports a next beam report considering L group with L>1.

Information indicating minimal groups

Measurement quantity (L1 RSRP and CSI reporting support (when the CSI-RS is for CSI acquisition)) for Nl beam If applicable, information indicating Nl DL transmission beams The group-based beam reporting as described above may be configured on a UE-by-UE basis. Further, the group-based beam reporting may be turned off on the UE-by-UE basis (e.g., when L=1 or N1=1).

NR supports that UE may trigger a mechanism which the UE recovers from the beam failure.

A beam failure event occurs when a quality of a beam pair link of an associated control channel is sufficiently low (e.g., a comparison with a threshold, a timeout of an associated timer). The mechanism recovered from the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. In this case, M≤1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling method for a beam indication for the NR-PDCCH (i.e., a configuration method for monitoring the NR-PDCCH) includes MAC CE signaling, RRC signaling, DCI signaling, specification transparent and/or implicit methods, and combinations of the signaling methods.

For the reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, the information also indicates the RS antenna port QCLed with the DMRS antenna port. A different set of DMRS antenna ports for a DL data channel may be represented as a different set of RS antenna ports and a QCL.

Hereinafter, prior to describing the methods proposed in this specification in detail, contents directly or indirectly related to the methods proposed in this specification will be briefly described first.

In next-generation communication including 5G, New Rat (NR), etc., as more and more communication devices require a larger communication capacity, there is a need for enhanced mobile broadband communication as compared with the existing radio access technology.

Further, massive machine type communications (MTCs), which provide various services anytime and anywhere by connecting many devices and objects, are one of the major issues to be considered in the next generation communication.

In addition, a communication system design or structure considering a service/UE sensitive to reliability and latency is being discussed.

The introduction of next generation radio access technology (RAT) considering enhanced mobile broadband communication (eMBB), massive MTC (mMTC), ultra-reliable and low latency communication (URLLC) is currently discussed, and in this specification, the technology is called 'new RAT (NR)' for convenience.

Self-Contained Slot Structure

Figure 5:
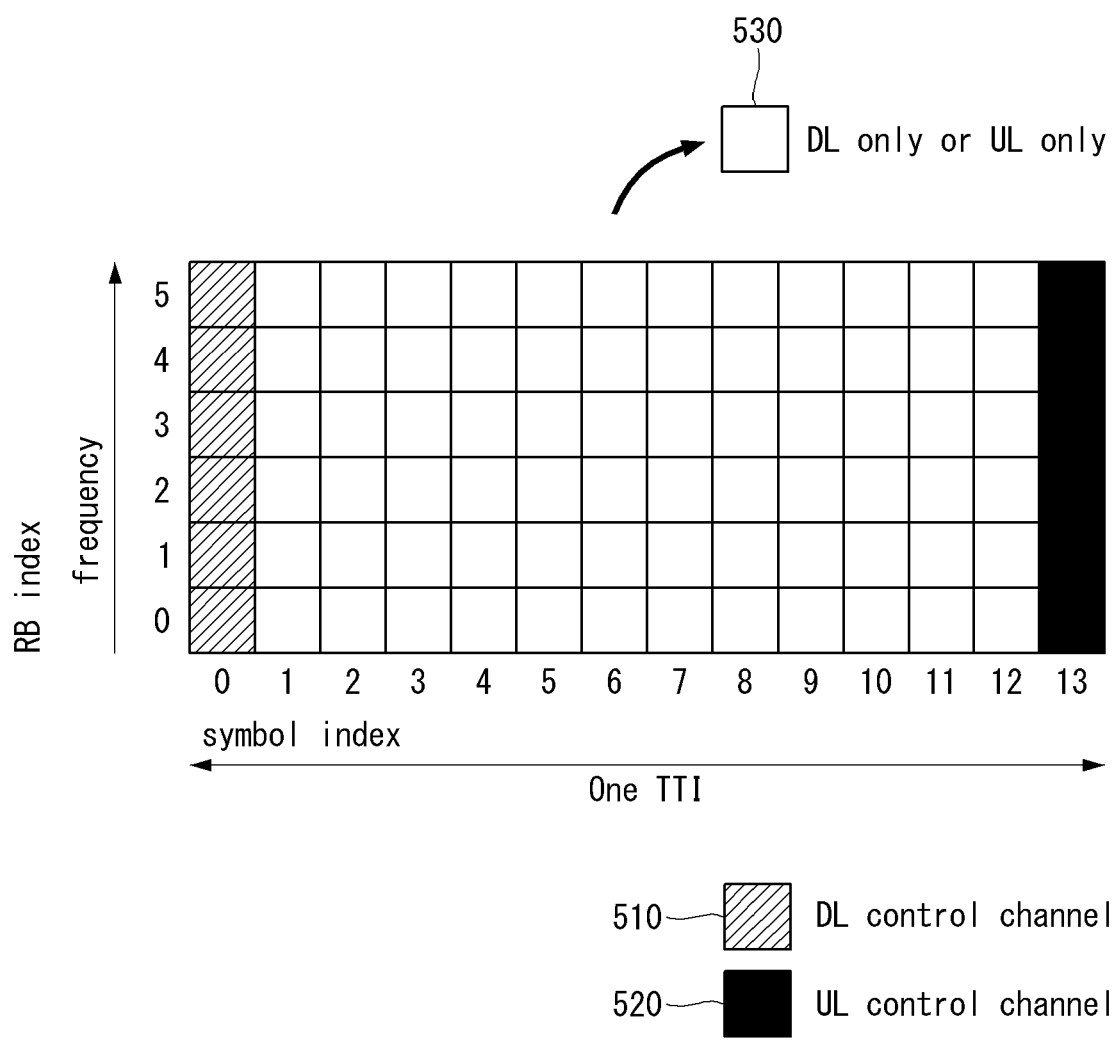
FIG. 5 is a diagram illustrating one example of a self-contained slot structure to which the method proposed in the present specification may be applied.

In order to minimize the latency of data transmission in a TDD system, the fifth generation new RAT considers a self-contained slot structure as shown in FIG. 5.

That is, FIG. 5 is a diagram illustrating one example of a self-contained slot structure to which the method proposed in this specification may be applied.

In FIG. 5, a dashed area 510 indicates a downlink control area and a black area 520 indicates an uplink control area.

An unmarked area 530 may be used for downlink data transmission or for uplink data transmission.

Such a structure may be characterized in that DL transmission and UL transmission are sequentially performed in one slot, and DL data may be transmitted in one slot, and UL ACK/NACK may also be transmitted and received.

Such a slot may be defined as a 'self-contained slot'.

That is, through such a slot structure, it takes less time for the eNB to retransmit data to the UE when a data transmission error occurs, thereby minimizing the latency of final data transmission.

In such a self-contained slot structure, there is a need for a time gap between the eNB and the UE for the conversion process from the transmission mode to the reception mode or from the reception mode to the transmission mode.

To this end, some OFDM symbols at the time of switching from DL to UL in the slot structure are configured to a guard period (GP).

Analog Beamforming

In the millimeter wave (mmW), the wavelength is shortened, so that a plurality of antenna elements may be installed in the same area.

That is, a total of 64 (8×8) antenna elements may be installed in a 2-dimension array at a 0.5 lambda (wavelength) interval on a panel of 4×4 cm with a wavelength of 1 cm in a 30 GHz band.

Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource.

However, when the TXRUs are installed on all of approximately 100 antenna elements, there is a problem that effectiveness is deteriorated in terms of costs.

Therefore, a method of mapping a plurality of antenna elements to one TXRU and adjusting a direction of a beam using an analog phase shifter is considered.

Such an analog beamforming method has a disadvantage in that frequency selective beamforming may not be performed by making only one beam direction in all bands.

A hybrid BF (HBF) with B TXRUs, which is an intermediate form of digital BF and analog BF, and fewer than Q antenna elements, may be considered.

In the HBF, although there is a difference depending on a connection method of B TXRUs and Q antenna elements, the number of directions of the beams that may be transmitted at the same time is limited to B or less.

Figure 6:
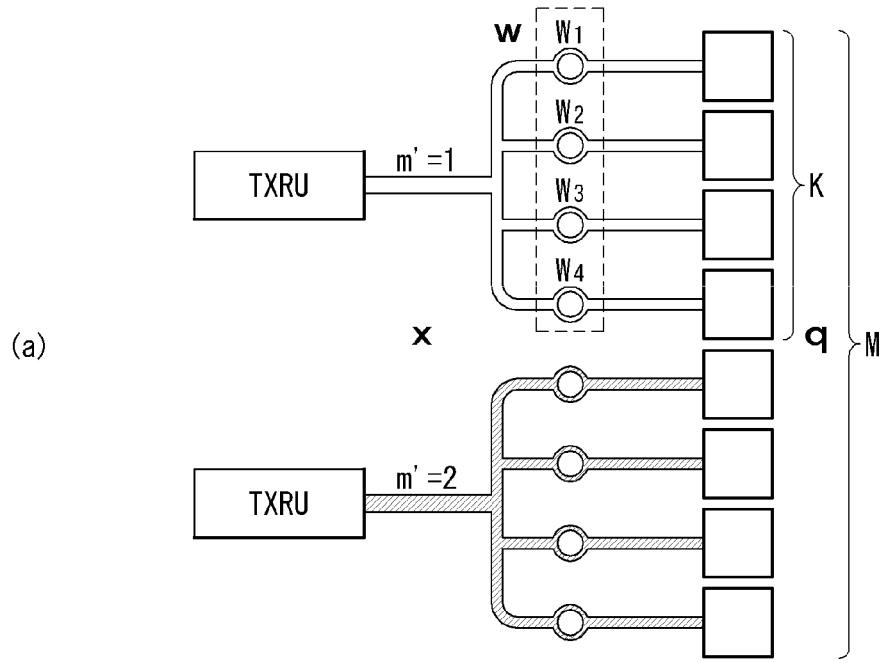
FIG. 6 illustrates examples of a connection scheme of a TXRU and an antenna element to which a method proposed in this specification may be applied.
Figure 6:
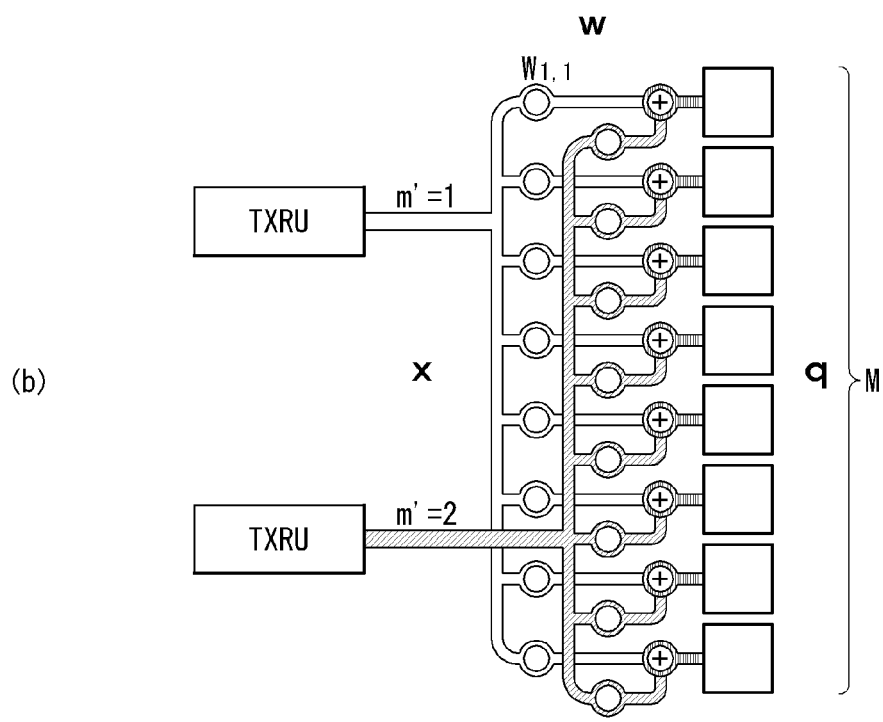

FIG. 6 illustrates examples of a connection scheme of a TXRU and an antenna element to which a method proposed in this specification may be applied.

In this case, a TXRU virtualization model shows a relationship between an output signal of the TXRUs and an output signal of the antenna elements.

FIG. 6(a) illustrates an example of a scheme in which the TXRU is connected to a sub-array.

Referring to FIG. 6(a), the antenna element is connected only to one TXRU. Unlike FIG. 6(a), FIG. 6(b) illustrates a scheme in which the TXRU is connected to all antenna elements.

That is, in the case of FIG. 6(b), the antenna element is connected to all TXRUs.

In FIG. 6, W represents a phase vector multiplied by an analog phase shifter.

In other words, a direction of analog beamforming is determined by W. In this case, mapping of CSI-RS antenna ports and TXRUs may be 1-to-i or 1-to-many.

CSI Feedback

In a 3GPP LTE/LTE-A system, user equipment (UE) is defined to report channel state information (CSI) to a base station (BS).

In this case, the channel state information (CSI) collectively refers to information that may indicate the quality of a radio channel (or also referred to as a link) formed between the UE and the antenna port.

For example, a rank indicator (RI), a precoding matrix indicator (PMI), a channel quality indicator (CQI), and the like correspond to the information.

In this case, the RI represents rank information of a channel, which means the number of streams received by the UE through the same time-frequency resource. Since this value is determined depending on the long term fading of the channel, the value is fed back from the UE to the BS with a period usually longer than the PMI and the CQI.

The PMI is a value reflecting a channel space characteristic and represents a preferred precoding index preferred by the UE based on a metric such as SINR.

The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process.

In this case, the CSI process is constituted by a CSI-RS for signal quality measurement from the BS and a CSI-interference measurement (CSI-IM) resource for interference measurement.

Reference Signal (RS) Virtualization

In the mmW, it is possible to transmit a PDSCH only in one analog beam direction at a time by analog beamforming.

Therefore, the eNB transmits data only to a small number of some UEs in a specific direction.

Therefore, if necessary, the analog beam direction is differently configured for each antenna port so that data transmission may be simultaneously performed to a plurality of UEs in several analog beam directions.

Figure 7:
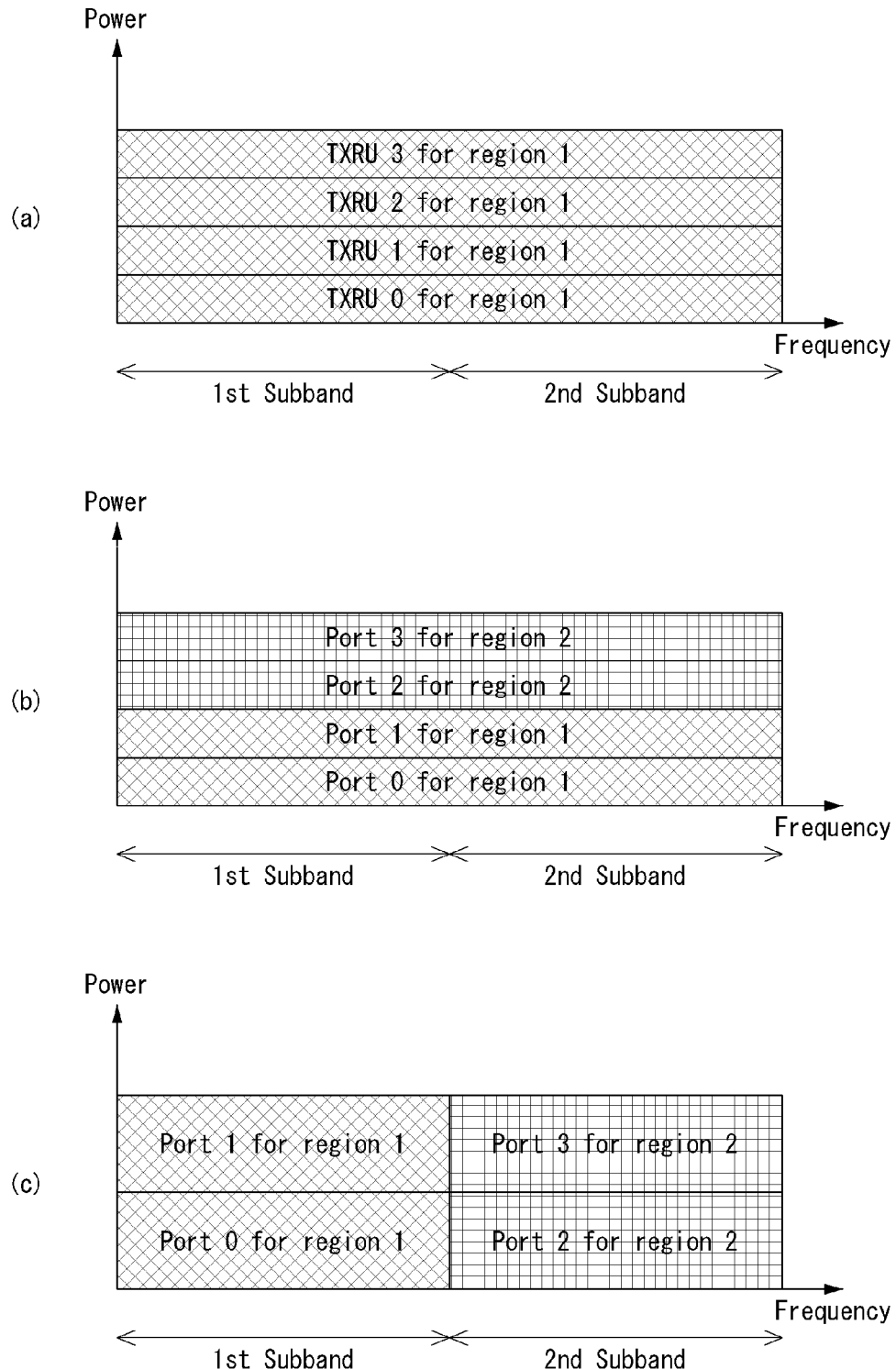
FIG. 7 illustrates various examples of a service area for TXRU to which a method proposed in this specification may be applied.

FIG. 7 illustrates various examples of a service area for TXRU to which a method proposed in this specification may be applied.

In FIG. 7, 256 antenna elements are divided into 4 parts to form 4 sub-arrays, and the structure of connecting the TXRU to each sub-array will be described as an example.

When each sub-array is constituted by a total of 64 (8×8) antenna elements in the form of a 2-dimensional array, specific analog beamforming may cover an area corresponding to a 15-degree horizontal angle area and a 15-degree vertical angle area.

That is, the zone where the eNB should be served is divided into a plurality of areas, and services are provided one by one at a time.

In the following description, it is assumed that the CSI-RS antenna ports and the TXRUs are 1-to-1 mapped.

Therefore, it may be interpreted that the antenna port and the TXRU have the same meaning as the following description.

If all TXRUs (antenna ports, sub-arrays) have the same analog beamforming direction as illustrated in FIG. 7(a), the throughput of the corresponding zone may be increased by forming digital beam with higher resolution.

Further, it is possible to increase the throughput of the corresponding zone by increasing the RANK of the transmission data to the corresponding zone.

In addition, as illustrated in FIG. 7(b), if each TXRU (antenna port, sub-array) has a different analog beamforming direction, the data may be transmitted simultaneously to UEs distributed in a wider area in the subframe (SF).

As illustrated in FIG. 7(b), two of four antenna ports are used for PDSCH transmission to UE1 in region 1 and the remaining two antenna ports are used for PDSCH transmission to UE2 in Area 2.

Further, FIG. 7(b) illustrates an example in which PDSCH 1 transmitted to UE 1 and PDSCH 2 transmitted to UE 2 are subjected to spatial division multiplexing (SDM).

Unlike this, as illustrated in FIG. 7(c), PDSCH 1 transmitted to UE 1 and PDSCH 2 transmitted to UE 2 may be transmitted by frequency division multiplexing (FDM).

Among a scheme of servicing one area using all the antenna ports and a scheme of servicing many areas at the same time by dividing the antenna ports, a preferred scheme may be changed according to the RANK and the MCS servicing to the UE for maximizing the cell throughput.

Further, the preferred scheme is changed according to the amount of data to be transmitted to each UE.

The eNB calculates a cell throughput or scheduling metric which may be obtained when one area is serviced using all the antenna ports, and calculates the cell throughput or scheduling metric which may be obtained when two areas are serviced by dividing the antenna ports.

The eNB compares the cell throughput or the scheduling metric which may be obtained by each scheme to select the final transmission scheme.

As a result, the number of antenna ports participating in PDSCH transmission is changed by SF-by-SF.

In order for the eNB to calculate the transmission MCS of the PDSCH according to the number of antenna ports and reflect the calculated transmission MCS to a scheduling algorithm, the CSI feedback from the appropriate UE is required.

Channel State Information Feedback

In most cellular systems including legacy LTE systems, the UE receives a pilot signal (e.g., a reference signal (RS)) for channel estimation from the base station, computes channel state information (CSI), and reports the computed value to the base station. The base station transmits a data signal (i.e., downlink data) based on the CSI information fed back from the UE. In the case of LTE system, the CSI information fed back from the UE includes channel quality information (CQI), precoding matrix index (PMI)l and rank indicator (RI). The CQI feedback, PMI feedback, and RI feedback are described below in detail.

First, the CQI feedback is radio channel quality information that the UE provides to the base station, for the purpose of providing information about what modulation and coding scheme (MCS) to apply when the base station transmits data. Where the radio quality between the base station and the UE is high, the UE feeds back a high CQI value to the base station. Receiving the high CQI value, the base station transmits data, with a relatively high modulation order and low channel coding rate applied. In contrast, where the radio quality between the base station and the UE is low, the UE feeds back a low CQI value to the base station. Receiving the low CQI value, the base station transmits data, with a relatively low modulation order and high channel coding rate applied.

Next, the PMI feedback is preferred precoding matrix information that the UE provides to the base station, for the purpose of providing information about what multiple-input multiple-output (MIMO) precoding scheme to apply when the base station has multiple antennas. The UE estimates the downlink MIMO channel between the base station and the UE from the pilot signal and transfers, by feedback, information about what MIMO precoding is to be applied to deliver more efficiency. LTE systems consider only linear MIMO precoding that may be represented in the form of a matrix in the PMI configuration.

In this case, the base station and the UE share a codebook constituted of multiple precoding matrixes. Each MIMO precoding matrix in the codebook has a unique index. Thus, the UE minimizes its feedback information quantity by feeding back, via the PMI, the index of the most favored MIMO precoding matrix in the codebook. At this time, the PMI value need not be constituted of only one index.

As an example, where the number of transmit antennas of an LTE system is eight, such a configuration may be made that two indexes (e.g., W1 and W2) need to be combined to produce a final 8 transmit (Tx) MIMO precoding matrix. W1, which corresponds to the first PMI, is fed back in a longer period (e.g., a long term) and has a wideband property. Thus, W1 may be referred to as a wideband PMI. W2, which corresponds to the second PMI, is fed back in a shorter period (e.g., a short term) and has a subband property. Thus, W2 may be referred to as a subband PMI.

At this time, the final precoder may be constituted of the product of W1 and W2. Here, W1 may be configured to select a beam group per polarization in a cross-polarization antenna environment, and W2 may be configured for final beam selection in each polarization and co-phasing between cross-polarizations. Such an occasion may occur where the number of beams in the beam group is 1. In such a case, W2 may be configured only for co-phasing. The number of beams in the beam group and what pattern of combination of vertical beams and horizontal beams is used to select a beam group may be designated as codebook configuration parameters by the base station.

Next, the RI feedback is information about the number of preferred transmission layers that the UE provides to the base station for the purpose of providing information about transmission layers preferred by the UE when the base station and the UE have multiple antennas so that multi-layer transmission is possible via spatial multiplexing. At this time, the RI is closely related to the PMI since the base station needs to be aware what precoding should be applied to each layer depending on the number of transmission layers.

A method that may be considered in configuring PMI/RI feedback is to configure a PMI codebook based on single layer transmission and then define a PMI per layer and allow the UE to feed back. However, this method has the drawback that as the number of transmission layers increases, the quantity of PMI/RI feedback information significantly increases. Thus, in the case of LTE system, a PMI codebook is defined for each number of transmission layers. In other words, for R-layer transmission, N Nt×R-size matrixes are defined in the codebook. Here, R, Nt, and N, respectively, denote the number of layers, the number of transmit antennas, and the size of codebook. Thus, in the case of LTE system, the size of PMI codebook is defined regardless of the number of transmission layers. In this case, the number R of transmission layers is identical to the rank value of the precoding matrix (Nt×R matrix).

Further, a non-precoded CSI-RS-based Class A operation and a beamformed CSI-RS-based Class B are defined in the full dimension (FD)-MIMO of LTE system. Here, the most noticeable feature of Class A operation is that the PMI codebook designed for supporting horizontal beamforming has been expanded to be able to support vertical and horizontal beamforming. Unlike its legacy operation and the Class A operation, the Class B operation features that the base station applies beamforming upon CS-RS transmission (e.g., transmission in a similar manner to the DMRS).

For example, 4 port CSI-RS resource A and 4 port CSI-RS resource B may be configured to be transmitted, with beamforming applied thereto in a different direction per resource. In this case, the UE may select one with better quality of the two CSI-RS resources and then feed back channel state information (e.g., PMI, CQI, or RI) for the resource. Such index related to selection of a CSI-RS resource may be referred to as a CSI-RS resource indicator (CRI) and, as a CSI feedback parameter, the index may be fed back along with other channel state information (e.g., PMI, CQI, or RI).

In the case of Class B operation, a different type of beamforming per port in the same resource may apply. In this case, only a specific port may be selectively used with a port selection codebook, or they may be combined and used with a port combining codebook.

For enhanced FD-MIMO (eFD-MIMO), there is considered a technique denoted as a hybrid CSI operation. The concept of this technique is to expand the legacy two-step procedure, in which the base station transmits a CSI-RS and the UE computes and feeds back a CSI, to a four-step procedure: i) the base station transmits a CSI-RS; ii) the UE computes and feeds back a CSI; iii) the base station transmits a CSI-RS based on the CSI feedback; and iv) the UE computes and feeds back a CSI. At this time, the following two mechanisms may be taken into consideration.

First, considered is 'hybrid CSI mechanism 1' which is a combination of Class A and Class B operations. In this mechanism, i) the base station transmits a non-precoded CSI-RS, ii) the UE feeds back an RI and a (WB) PMI, iii) the base station transmits a beamformed CSI-RS based on the feedback information, and iv) the UE feeds back a PMI, RI, and CQI for the beamformed CSI-RS.

Considered next is 'hybrid CSI mechanism 2' which is a combination of two Class B operations. In this mechanism, i) the base station transmits multiple beamformed CSI-RS resources, ii) the UE feeds back a CRI (thus, a beam is selected), iii) the base station transmits beamformed CSI-RS ports based on the CRI, and iv) the UE feeds back a PMI, RI, and CQI for the CSI-RS.

As described herein, "PMI/RI" is not limited to the PMI/RI in the LTE system, which means the index value of the precoding matrix (Nt×R matrix) and the rank value of the precoding matrix. Further, "PMI" described herein means information indicating information for a preferred MIMO precoder among MIMO precoders applicable to the transmit end. In this case, the type of precoder is not limited only to linear precoders representable as a matrix. Further, "RI" as described herein encompasses all feedback information indicating the number of preferred transmission layers and may be interpreted as broader than the RI in LTE.

The CSI information may be created in the entire or partial system frequency domain. In particular, in wideband (or broadband) systems, it may be efficient to generate and feed back CSI information for a partial frequency domain (e.g., a subband) preferred per UE.

Further, in the LTE system, feedback of CSI information is performed via an uplink channel. Typically, periodic CSI feedback is performed via the physical uplink control channel (PUCCH), and aperiodic CSI feedback is performed via the physical uplink shared channel (PUSCH).

PUCCH CSI reporting modes for periodic CSI feedback performed via the PUCCH may be defined as shown in Table 4. Here, PUCCH CSI reporting modes mean modes divided into as to what information the UE needs to feed back when the UE should perform periodic CSI feedback.

TABLE 4

|  |  | PMI Feedback Type | |
| --- | --- | --- | --- |
|  |  | No PMI (OL, single-antenna) | Single PMI (CL) |
| CQI Feedback Type | Wideband | Mode 1-0 RI One wideband CQI(4 bit) When RI > 1, CQI of first codeword | Mode 1-1 RI Wideband CQI(4 bit) Wideband spatial CQI(3 bit) for RI > 1 Wideband PMI(4 bit) |
|  | UE selected | Mode 2-0 RI Wideband CQI(4 bit) Best-1 CQI(4 bit) in each BP Best-1 indicator (L-bit label) When RI > 1, CQI of first codeword | Mode 2-1 RI Wideband CQI(4 bit) Wideband spatial CQI(3 bit) for RI > 1 Wideband PMI(4 bit) Best-1 CQI(4 bit) in each BP Best-1 spatial CQI (3 bit) for RI > 1 Best-1 indicator (L-bit label) |

Unlike aperiodic CSI feedback, aperiodic CSI feedback is temporarily performed only when the base station sends a request for CSI feedback information. In this case, the base station triggers aperiodic CSI feedback via a downlink control channel, such as the physical determine control channel (PDCCH)/enhanced PDCCH (ePDCCH). Where aperiodic CSI feedback is triggered in an LTE system, PUSCH CSI reporting modes as to what information the UE needs to feed back may be defined as shown in Table 5. In this case, the PUSCH CSI reporting mode in which the UE is to operate may be indicated by higher layer signaling (i.e., a higher layer message).

TABLE 5

| | PMI Feedback Type | |
|---|---|---|
| | No PMI (OL, TD, single-antenna) | With PMI (CL) |
| PUSCH CQI feedback type | Wideband (Wideband CQI) | Mode 1-2: Multiple PMI RI<br>$1^{st}$ wideband CQI(4 bit)<br>$2^{nd}$ wideband CQI(4 bit) if RI > 1<br>Subband PMIs on each subband |
| | UE Selected (subband CQI) | Mode 2-0<br>RI (only for Open-loop SM)<br>Wideband CQI (4 bit) + Best-M CQI(2 bit)<br>Best-M index<br>When RI > 1,<br>CQI of first codeword | Mode 2-2: Multiple PMI RI<br>$1^{st}$ wideband CQI(4 bit) + Best-M CQI(2 bit)<br>$2^{nd}$ wideband CQI(4 bit) + Best-M CQI(2 bit) if RI > 1<br>Wideband PMI/Best-M PMI Best-M index |
| | Higher layer-configured (subband CQI) | Mode 3-0<br>RI (only for Open-loop SM)<br>widebandCQI(4 bit) + subband CQI (2 bit)<br>When RI > 1,<br>CQI of first codeword | Mode 3-1: Single PMI RI<br>$1^{st}$ wideband CQI(4 bit) + subband CQI(2 bit)<br>$2^{nd}$ wideband CQI(4 bit) + subband CQI (2 bit) if RI > 1<br>Wideband PMI |

Since the PUCCH is smaller than the PUSCH in the amount of data simultaneously transmittable (i.e., payload size), the PUCCH may have difficulty in transmitting CSI information at once. Thus, depending on each PUCCH CSI reporting mode, the time (e.g., subframe) when the CQI and PMI are transmitted may be set to differ from the time when the RI is transmitted. For example, in Mode 1-0 of Table 4, the UE may transmit only RI at a specific PUCCH transmission time and wideband CQI at a different PUCCH transmission time.

A PUCCH reporting type may be defined depending on the kind of CSI information configured at a specific PUCCH transmission time. For example, the reporting type in which RI alone is transmitted corresponds to type 3, and the reporting type in which only CQI is transmitted corresponds to type 4. A feedback period and offset for RI and a feedback period and offset for CQI/PMI may be indicated (or set) to the UE via higher layer signaling (i.e., a higher layer message).

The above-described CSI feedback information is included in the uplink control information (UCI).

Beam Reference Signal (BRS)

Beam reference signals are transmitted on one or more antenna ports (p=(0, 1, . . . , 7)).

Reference sequence rl(m) is defined by Equation 2 in relation with generation of a sequence of the BRSs.

$$r_l(m) = \frac{1}{\sqrt{2}}(1 - 2 \cdot c(2m)) + j\frac{1}{\sqrt{2}}(1 - 2 \cdot c(2m+1)), \quad \text{[Equation 2]}$$

$$m = 0, 1, \ldots, 8 \cdot (N_{RB}^{max,DL} - 18) - 1$$

In Equation 2, 1 as 0 to 13 represents an OFDM symbol number. Further, c(i) denotes a pseudo-random sequence and a pseudo-random sequence generator may be initialized to Equation 3 at the beginning of each OFDM symbol.

$$C_{init} = 2^{10} \cdot (7 \cdot (n_s + 1) + l' + 1)(2 \cdot N_{ID}^{cell} + 1) + 2 \cdot N_{ID}^{cell} + 1 \quad \text{[Equation 3]}$$

Beam Refinement Reference Signal

Further, in relation with the beam refinement reference signal, the beam refinement reference signal is transmitted through antenna ports of up to 8 antenna ports (p=600 to 607).

In relation with the sequence generation of the beam refinement reference signal, reference signal rl,ns(m) is generated as shown in Equation 4.

$$r_{l,n_s}(m) = \frac{1}{\sqrt{2}}(1 - 2c(2m)) + j\frac{1}{\sqrt{2}}(1 - 2c(2m+1)), \quad \text{[Equation 4]}$$

$$m = 0, 1, \ldots, \left\lfloor \frac{3}{8} N_{RB}^{max,DL} \right\rfloor - 1$$

In Equation 4, ns represents a slot number in a radio frame and l represents the OFDM symbol number in the slot. c(n) denotes the pseudo-random sequence and the pseudo-random sequence generator is initialized to Equation 5 at the beginning of each OFDM symbol.

$$C_{init} = 2^{10} \cdot (7 \cdot (\bar{n}_s + 1) + l + 1)(2 \cdot N_{ID}^{BRRS} + 1) + 2 \cdot N_{ID}^{BRRS} + 1 \quad \text{[Equation 5]}$$

In Equation 5, $N_{ID}^{BRRS}$ is configured in the UE through an RRC signaling.

DL Phase Noise Compensation Reference Signal

A phase noise compensation reference signal associated with xPDSCH (i.e., the PDSCH supported by the NR system) is transmitted at the antenna port(s) p=60 and/or p=61 via A signaling in A DCI format. Further, the phase noise compensation reference signal is present and/or valid only for the xPDSCH transmission associated with the antenna port, and is transmitted only in the physical resource blocks and symbols to which an sPDSCH is mapped. Further, the phase noise compensation reference signal is the same in all symbols corresponding to xPDSCH allocation.

Reference sequence r(m) is defined by Equation 6 in relation with generation of the sequence of the phase noise compensation reference signal.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 6]}$$

$$m = 0, 1, \ldots, \lfloor N_{RB}^{max,DL}/4 \rfloor - 1$$

In Equation 6, c(i) denotes the pseudo-random sequence and the pseudo-random sequence generator is initialized to Equation 7 at the beginning of each subframe.

$$c_{init} = (\lfloor n_s/2 \rfloor + 1) \cdot (2n_{ID}^{(nSCID)} + 1) \cdot 2^{16} + n_{SCID} \quad \text{[Equation 7]}$$

In Equation 7, in the case of transmission of the xPDSCH, nSCID is given by a DCI format related with the transmission of the xPDSCH and otherwise, nSCID is set to 0.

Further, in the case of 3-dimension multiple-input multiple-output (3D-MIMO) or full-dimension multiple-input multiple-output (MIMO) technology, an active antenna system (AAS) having a 2-dimensional planar array structure may be used.

Figure 8:
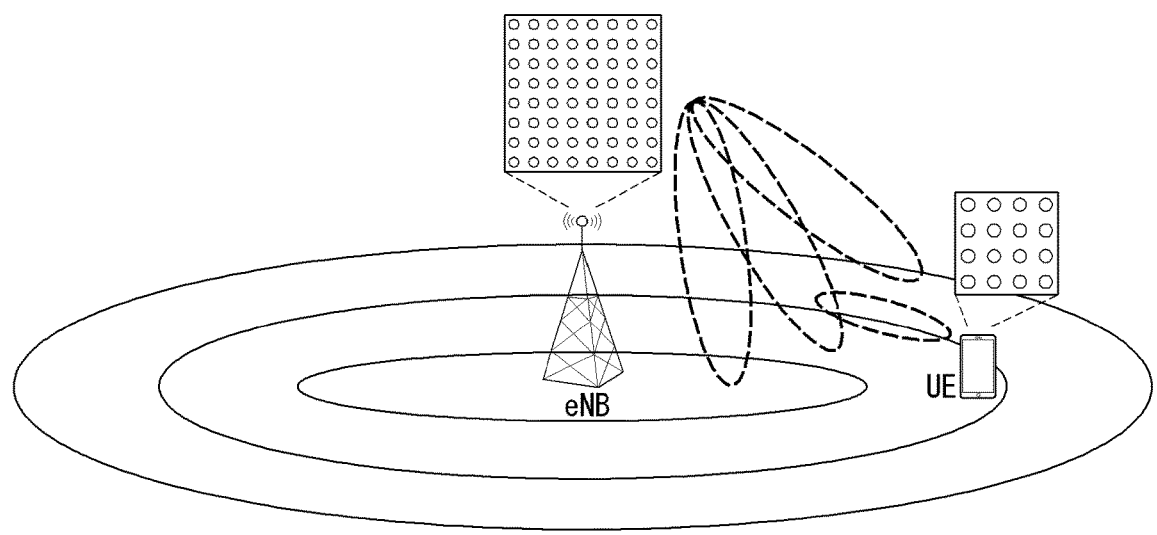
FIG. 8 illustrates an example of an MIMO system using a 2D plane array structure to which a method proposed in this specification may be applied.

FIG. 8 illustrates an example of an MIMO system using a 2D plane array structure to which a method proposed in this specification may be applied.

Through the 2D plane array structure, a large number of antenna elements may be packed within available base station type of elements and an adaptive electronic capability in a 3D space may be provided.

CSI Framework in NR System

In relation to designing NR system MIMO, a CSI framework for channel state measurement and reporting between base station and UE is taken into account. The CSI framework considered for the NR system is described below in detail.

The CSI framework may mean that a CSI related procedure is defined using CSI reporting setting, resource setting, CSI measurement setting, and CSI measurement setting unlike a legacy LTE system in which the CSI related procedure is defined only in the form of a CSI process. Accordingly, in the NR system, the CSI related procedures may be performed in a more flexible scheme according to a channel and/or resource situation.

That is, a configuration for the CSI related procedure in the NR system may be defined by combining the CSI reporting setting, the resource setting, and the CSI measurement setting.

For example, the UE may be configured to acquire the CSI by N≤1 CSI reporting settings, M≤1 resource settings, and one CSI measurement setting. In this case, the CSI measurement setting may mean setting information for a link between N CSI reporting settings and M resource settings. Further, here, the resource settings include reference signal (RS) settings and/or Interference Measurement settings (IM settings).

Figure 9:
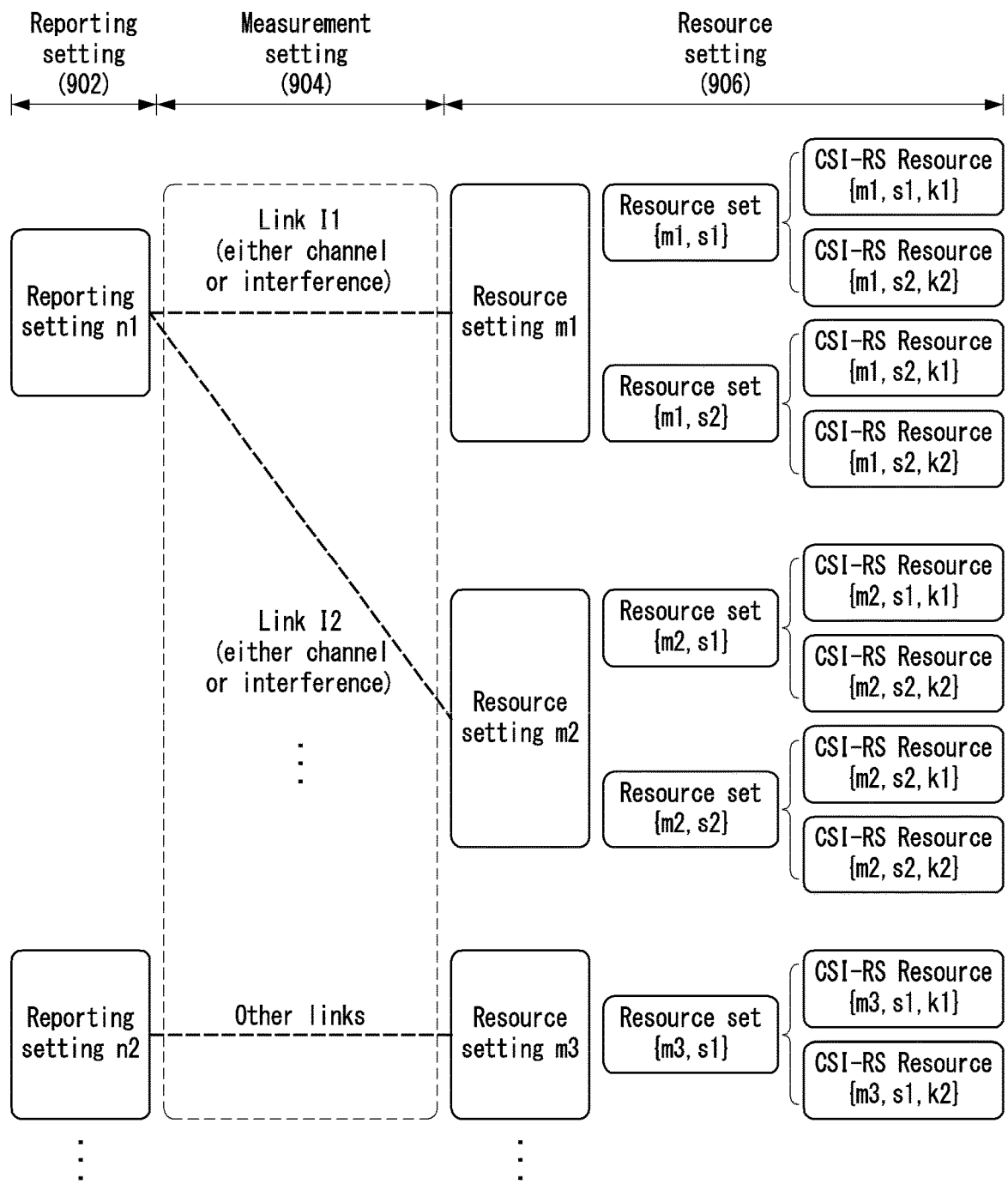
FIG. 9 illustrates an example of a CSI framework considered in an NR system to which a method proposed in this specification may be applied.

FIG. 9 illustrates an example of a CSI framework considered in an NR system to which a method proposed in this specification may be applied.

Referring to FIG. 9 may be configured by reporting setting 902, measurement setting 904, and resource setting 906. In this case, the reporting setting may mean the CSI reporting setting, the measurement setting may mean the CSI measurement setting, and the resource setting may mean the CSI-RS resource setting.

In FIG. 9, the CSI-RS resource has been illustrated, but the present disclosure is not limited thereto. The CSI-RS resource may be substituted with a resource for a downlink reference signal (DL RS) available for CSI acquisition or beam management.

As illustrated in FIG. 9, the reporting setting 902 may be constituted by N (N≤1) report settings (e.g., Reporting setting n1, Reporting setting n2, etc.). Further, the resource setting 906 may be constituted by M (M≤1) resource settings (e.g., Resource setting m1, Resource setting m2, Resource setting m3, etc.). In this case, each resource setting may include S (S≤1) resource sets and each resource set may include K (K≤1) CSI-RSs.

Further, the measurement setting 904 may mean setting information indicating the link between the reporting setting and the resource setting and a measurement type configured for the corresponding link. In this case, each measurement setting may include L (L≤1) links. For example, the measurement setting may include setting information for a link (Link l1) between Reporting setting n1 and Resource setting m1, setting information for a link (Link l2) between Reporting setting n1 and Resource setting m2, and the like.

In this case, each of Link l1 and Link l2 may be configured as any one of a channel measurement link or an interference measurement link. Moreover, Link l1 and/or Link l2 may be configured for rate matching or other purposes.

In this case, one or more CSI reporting settings within one CSI measurement setting may be selected dynamically via Layer 1 (L2) signaling or L2 (Layer 2) signaling. Further, one or more CSI-RS resource sets selected from at least one resource setting and one or more CSI-RS resources selected from at least one CSI-RS resource set are also dynamically selected via the L1 or L2 signaling.

Hereinafter, the CSI reporting setting, the resource setting (i.e., CSI-RS resource setting), and the CSI measurement setting constituting the CSI framework considered in the NR system will be described.

CSI Reporting Setting

First, a CSI reporting setting may mean information for setting the type of CSI reporting to be performed by a UE with respect to a base station and information included in corresponding CSI reporting.

For example, a CSI reporting setting may include a time-domain behavior type, frequency granularity, a CSI parameter (e.g., precoding matrix indicator (PMI), rank indicator (RI), channel quality indicator (CQI)) to be reported, a CSI type (e.g., CSI Type 1 or 2), a codebook configuration including a codebook subset restriction, and a measurement restriction configuration.

In this specification, a time-domain behavior type may mean an aperiodic behavior, a periodic behavior, or a semi-persistent behavior.

In this case, a configuration parameter(s) for a CSI reporting setting may be configured (or indicated) through higher layer signaling (e.g., RRC signaling).

Furthermore, in relation to the CSI reporting setting, three types of frequency granularities, that is, wideband reporting, partial band reporting and subband reporting, may be supported.

Resource Setting

Next, the resource setting may mean information for setting resource to be used for CSI measurement and reporting. For example, the resource setting may include an operation pattern of the time domain, a type (e.g., Non-Zero Power CSI-RS (NZP CSI-RS), Zero Power CSI-RS (ZP CSI-RS), DMRS, etc.) of the RS, a resource set constituted by K resources, and the like.

As mentioned above, each resource setting may include one or more resource sets and each resource set may include one or more resources (e.g., CSI-RS resources). Further, the resource setting may include a setting for a signal for channel measurement and/or interference measurement.

As an example, each resource setting may include setting information for S resource sets (e.g., CSI-RS resource sets) and may also include setting information for K resources for each resource set. In this case, each resource set may correspond to sets differently selected from a pool of all CSI-RS resources configured for the UE. Further, the setting information for each resource may include information to a resource element, the number of ports, the operation type of the time domain, and the like.

Alternatively, as another example, each resource setting may include setting information for S CSI-RS resources and/or K CSI-RS resources of ports of a number equal to or smaller than each CSI-RS resource.

In this case, a CSI-RS RE mapping pattern of an N-port CSI-RS resource may be constituted by one or more CIS-RS mapping patterns of CSI-RS resources of the same or smaller number. In this case, the CSI-RS RS mapping pattern may be defined in the slot and spanned to multiple configurable consecutive/inconsecutive OFDM symbols.

In this case, a setting parameter(s) for the resource setting may be configured through higher layer signaling (e.g., RRC signaling).

Furthermore, in the case of each a semi-persistent resource setting or a periodic resource setting, periodicity may be additionally included in configuration information.

CSI Measurement Setting

Next, the CSI measurement setting may mean setting information indicating which measurement the UE is to perform with respect to a specific CSI reporting setting and a specific resource setting mapped thereto for the CSI reporting. That is, the CSI measurement setting may include information on the link between the CSI reporting setting and the resource setting and may include information indicating a measurement type for each link. Further, the measurement type may mean channel measurement, interference measurement, rate matching, etc.

As an example, the CSI measurement setting may include information indicating the CSI reporting setting, information indicating the resource setting, and a setting for a reference transmission scheme in the case of the CQI. In this regard, the UE may support L≤1 CSI measurement settings and an L value may be set according to a capability of the corresponding UE.

In this case, one CSI reporting setting may be connected to one or more resource settings and multiple CSI reporting settings may be connected to the same resource setting. In this case, a setting parameter(s) for the CSI measurement setting may be configured through higher layer signaling (e.g., RRC signaling).

Furthermore, in the NR system, zero-power (ZP) CSI-RS-based interference measurement for CSI feedback is supported. Furthermore, an aperiodic interference measurement resource (IMR), a semi-persistent IMR, and periodic IMRCSI feedback based on a ZP CSI-RS for interference measurement may be supported.

Furthermore, in relation to the CSI reporting setting, resource setting, and CSI measurement setting, agreements according to the time-domain behavior type are as follows.

First, in the case of the periodic CSI-RS (i.e., a case where transmission of the CSI-RS is periodically performed), semi-persistent CSI reporting may be activated/deactivated by MAC CE and/or downlink control information (DCI). Unlike this, the aperiodic CSI reporting may be triggered by the DCI, however, in this case, additional signaling configured to the MAC CE may be required.

Next, in the case of the semi-persistent CSI-RS (i.e., a case where transmission of the CSI-RS is semi-persistently performed), periodic CSI reporting is not supported. On the contrary, semi-persistent CSI reporting may be activated/deactivated by the MAC-CE and/or DCI and the semi-persistent CSI-RS may be activated/deactivated by the MAC-CE and/or DCI. Further, in this case, the aperiodic CSI reporting may be triggered by the DCI and the semi-persistent CS-RS may be activated/deactivated by the MAC-CE and/or DCI.

Last, in the case of the aperiodic CSI-RS (i.e., a case where transmission of the CSI-RS is aperiodically performed), the periodic (and semi-persistent) CSI reporting is not supported. On the contrary, the aperiodic CSI reporting may be triggered by the DCI and the aperiodic CS-RS may be triggered by the DC and/or MAC-CE.

Referring to the contents and the agreements, in the NR system, three time-domain behavior types may be supported in relation to CSI reporting. In this case, the three time-domain behavior types may mean aperiodic CSI reporting, semi-persistent CSI reporting, and periodic CSI reporting. Likewise, the NR system can support some of or all the three time-domain behavior types with respect to reporting related to an (analog and/or digital) beam.

As mentioned above, aperiodic CSI reporting may mean that the UE performs CSI reporting only when triggered. Further, semi-static CSI reporting may mean that the UE performs CSI reporting (according to a specific period) when the report is activated and stops CSI reporting when the report is deactivated. Further, periodic CSI reporting may mean that the UE performs CSI reporting according to a period and time (e.g., a slot offset) configured via, e.g., higher layer signaling (e.g., RRC signaling).

Furthermore, in the case of a downlink reference signal (DL RS) for channel measurement upon CSI acquisition, the three time-domain behavior types (e.g., aperiodic CSI-RS, semi-persistent CSI-RS, and periodic CSI-RS) may be supported. Likewise, some of or all the three time-domain behavior types may be supported for a DL RS for beam management. Basically, a CSI-RS is considered as a DL RS for beam management, but another DL signal may also be used. For example, a DL RS for beam management may be a mobility RS, a beam RS, a synchronization signal (SS), an SS block, a DL DMRS (e.g., PBCH DMRS or PDCCH DMRS), etc.

As mentioned above, aperiodic CSI-RS may mean that the UE performs measurement on the CSI-RS only when triggered. Further, semi-static CSI-RS may mean that the UE performs measurement on the CSI-RS (according to a specific period) when the CSI-RS is activated and stops CSI-RS measurement when the CSI-RS is deactivated. Further, periodic CSI-RS may mean that the UE performs CSI-RS measurement according to a period and time (e.g., a slot offset) configured via, e.g., higher layer signaling (e.g., RRC signaling).

Furthermore, as described above, the NR system can support a ZP CSI-RS-based interference measurement method in relation to an interference measurement resource (IMR) designated in a UE by a base station upon CSI acquisition. Furthermore, in relation to the interference measurement resource (IMR), at least one of a non-zero-power (NZP) CSI-RS-based interference measurement method or a DMRS-based interference measurement method may be supported.

In particular, unlike in the case where a ZP CSI-RS-based IMR is semi-statically configured in the LTE system (i.e., legacy LTE system), in the NR system, a method of dynamically configuring a ZP CSI-RS-based IMR may be supported. For example, a ZP CSI-RS-based aperiodic IMR, a semi-persistent IMR and/or a periodic IMR method may be used.

Accordingly, various combinations of the time-domain behavior types may be taken into consideration with respect to channel estimation (or channel measurement), interference estimation (or interference measurement), and reporting for CSI measurement and reporting. For example, aperiodic CSI reporting may be configured along with an aperiodic/semi-persistent/periodic NZP CSI-RS for channel measurement and an aperiodic/semi-persistent/periodic ZP CSI-RS for interference measurement. For another example, semi-persistent CSI reporting may be configured along with a semi-persistent/periodic NZP CSI-RS for channel measurement and a semi-persistent/periodic NZP CSI-RS for interference measurement. For yet another example, periodic CSI reporting may be configured along with a periodic NZP CSI-RS for channel measurement and a periodic NZP CSI-RS for interference measurement.

In this specification, "A/B" means A or B, and a combination of changed orders may be taken into consideration between "/." For example, "A/B and C/D" may mean "A and C", "A and D", "B and C", or "B and D."

In the examples, it is assumed that the aperiodic RS and/or IMR (e.g., aperiodic NZP CSI-RS and/or aperiodic ZP CSI-RS) is used for only aperiodic reporting, the semi-persistent RS and/or IMR (e.g., a semi-persistent NZP CSI-RS and/or a semi-persistent ZP CSI-RS) is used for only aperiodic or semi-persistent reporting, and the periodic RS and/or IMR (e.g., periodic NZP CSI-RS and/or periodic ZP CSI-RS) is used for all reportings. However, the present disclosure is not limited thereto, and various combinations (e.g., semi-persistent reporting configured along with an aperiodic RS and/or IMR) may be configured.

Furthermore, an RS and an IMR are included in all resource settings, and the usage (e.g., for channel estimation or for interference estimation) of a corresponding resource may be indicated through a configuration for each link in measurement setting.

When the above-described aperiodic CSI reporting is performed on an uplink data channel (e.g., the physical uplink shared channel (PUSCH)), the following schemes may be considered.

First, the CSI report may be configured to be multiplexed with uplink data transmitted via the uplink data channel. In other words, the CSI report and uplink data may be together transmitted via the uplink data channel.

In another possible configuration, only the CSI report, without uplink data, may be transmitted via the uplink data channel.

Such schemes may be commonly applicable to uplink control channels (e.g., the physical uplink control channel (PUCCH)) as well as uplink data channels.

For the NR systems, two kinds of uplink control channels (e.g., the PUCCH) may be considered. The two kinds of uplink control channels may be individually denoted as a short PUCCH and a long PUCCH.

The short PUCCH occupies one or two OFDM symbols on the time axis and one or more physical resource blocks (PRBs) on the frequency axis. As an example, the short PUCCH may be designed for the usage of fast ACK/NACK feedback mainly for downlink data (DL data) in the above-mentioned self-contained slot structure (e.g., FIG. 5).

In contrast, the long PUCCH occupies four to twelve OFDM symbols on the time axis and one or more PRBs on the frequency axis. As an example, the long PUCCH, similar to the legacy PUCCH (e.g., the PUCCH of the LTE system), may be designed to occupy a specific resource per UE for the usage of ACK/NACK and/or CSI feedback.

At this time, the minimum number of long PUCCH symbols being four may be related to various slot structures being considered for the NR system. As an example, for the NR system, the number of OFDM symbols included in one slot may be configured to 14 or 7.

Not only the slot structures for downlink (DL) and/or uplink (UL) usages, but other various slot structures, such as downlink (DL) dominant or uplink (UL) dominant structures, may be considered as well. As an example, downlink dominant structure may mean a structure in which the PDCCH, PDSCH, and short PUCCH coexist in the slot, and uplink dominant structure may mean a structure in which the PDCCH and the PUSCH coexist in the slot.

Further, multiple formats may be defined for the short PUCCH and/or long PUCCH which have the same number of symbols, and the size of payload transmittable may be configured to differ per format. For example, multiple short PUCCH formats and/or multiple long PUCCH formats may be defined depending on, e.g., the maximum number of UEs multiplexable or channel coding schemes.

As set forth above, the legacy LTE(-A) system supports aperiodic CSI reporting and periodic CSI reporting, and the UE is configured to perform CSI reporting via the PUSCH and PUCCH. However, the above-mentioned semi-static CSI reporting is not supported in the legacy LTE(-A) system.

In contrast, the NR system may consider aperiodic CSI reporting, periodic CSI reporting, and semi-static CSI reporting via the PUSCH and/or PUCCH. As an example, in the NR system, the UE may be configured to perform aperiodic CSI reporting via the PUSCH.

In this case, as in the legacy LTE(-A) system, the purposes (or usages) of the PUSCH in the NR system may be divided as follows.

PUSCH only for UL data transmission (hereinafter, a first PUSCH usage)

PUSCH for UL data transmission and CSI reporting (hereinafter, a second PUSCH usage)

PUSCH only for CSI reporting (hereinafter, a third PUSCH usage)

As such, the usages of PUSCH may be configured depending on the type of information allocated (or transferred) to the corresponding channel (i.e., the uplink data channel). Here, types of information may be classified depending on whether the CSI report is allocated to the channel, the CSI report and UL data are allocated, or UL data is allocated to the channel. In other words, the types of information may be divided into 'CSI reporting only type,' 'CSI reporting+UL data transmission type,' and 'UL data transmission only type.'

Typically, upon PUSCH allocation, the base station may indicate, via downlink control information (DCI), which the usage of the corresponding PUSCH corresponds to one of the three usages.

As an example, the usage of the PUSCH may be indicated by a combination of the UL modulation and coding scheme (UL MCS) field and the CSI request field of DCI format 0 and DCI format 4 for PUSCH allocation. Specifically, where aperiodic CSI reporting is triggered by the CSI request field, and the UL MCS field is an index corresponding to 'MCS=null value,' this may indicate the third PUSCH usage. Further, where aperiodic CSI reporting is triggered by the CSI request field, and the UL MCS field is a value indicating a specific MCS, this may indicate the second PUSCH usage. Further, where no aperiodic CSI reporting is triggered by the CSI request field, this may indicate the first PUSCH usage.

The same approach may also apply to the NR system.

In the legacy LTE(-A) system, the PUSCH is allocated to a fixed timing from the time of reception of DCI. For example, when the UE receives DCI for PUSCH allocation in the nth subframe, the UE may be configured to transmit the PUSCH in the n+4th subframe. Unlike this, in the NR system, the time of PUSCH allocation (i.e., PUSCH transmission timing) may be dynamically indicated by, e.g., DCI. Thus, more flexible PUSCH transmission may be performed in the NR system.

For example, the timing (i.e., timing offset) between UL allocation (or assignment) and the UL data transmission may be indicated by the DCI field among multiple values, and the multiple values may be configured via higher layer signaling. Of course, this way is commonly applicable to the timing between DL allocation and DL data transmission and the timing between DL data reception and transmission of an ACK/NACK for the DL data.

In connection, the NR system may consider more flexible CSI feedback timing for fast CSI acquisition.

At this time, the information transferred via CSI reporting may be configured in a diversity of manners in terms of the amount of information or computation time required. For example, the required CSI computation quantity and time may be varied depending on whether PMI is included in the CSI reporting information, the number of CSI-RS antennas when PMI is reported, and/or the codebook type.

Thus, a different CSI reporting offset value (or value range) as supported may be configured per condition and, for configuring a PUSCH transmission timing, such CSI reporting offset value may need to be considered. Here, CSI reporting offset may mean a time required for the UE to perform CSI reporting. As an example, the CSI reporting offset may be configured on a per-slot basis (e.g., a slot offset). Or, the CSI reporting offset may be configured on a per-slot basis and/or on a per-symbol basis.

In particular, in embodiments proposed herein, it is assumed to consider an aperiodic CSI reporting offset in relation to configuring a PUSCH transmission timing. Here, aperiodic CSI reporting offset may mean a time required for the UE to perform aperiodic CSI reporting.

The aperiodic CSI reporting offset may be referred to below as 'Y' for ease of description. However, the embodiments proposed herein may also be commonly applied to periodic CSI reporting and/or semi-static CSI reporting as well as aperiodic CSI reporting offset. Further, an offset required for UL data transmission, as well as CSI reporting offset, may need to be considered to configure the PUSCH transmission timing. This is why in the NR system the PUSCH may be used for the first PUSCH usage (i.e., PUSCH only for UL data transmission) or the second PUSCH usage (i.e., PUSCH for UL data transmission and CSI reporting).

Here, the offset required for UL data transmission may mean a time required for the UE to transmit UL data via the PUSCH and may correspond to a timing offset for transmitting the PUSCH for the first PUSCH usage. As an example, the offset required for UL data transmission may be configured on a per-slot basis (e.g., a slot offset). Or, the UL data transmission offset may be configured on a per-slot basis and on a per-symbol basis.

The offset required for UL data transmission may be referred to below as 'Z' for ease of description. Hereinafter, in the embodiments proposed herein, a range of Z is configured via higher layer signaling (i.e., a higher layer message), and a Z value actually applied is assumed to be indicated by DCI. In other words, in an applicable configuration, values of Z (i.e., Z value candidates) may be configured via higher layer signaling, and any one of the values may be indicated by DCI.

In the disclosure, there are proposed methods for configuring and/or indicating a PUSCH timing (i.e., a PUSCH transmission timing) according to the three PUSCH usages (i.e., the first PUSCH usage, the second PUSCH usage, and the third PUSCH usage) considering the aperiodic CSI reporting offset (i.e., Y) and the offset (i.e., Z) required for UL data transmission.

Although the embodiments of the disclosure are described in connection with the PUSCH for ease of description, the embodiments of the disclosure may also apply to other uplink channels (e.g., PUCCH, short PUCCH, or long PUCCH) or downlink channels (e.g., PDCCH or PDSCH).

The embodiments described below are divided merely for illustrating purposes, and some configurations or features of one of the embodiments may be included in another embodiment or may be replaced with some configurations or features of the other embodiment.

First Embodiment

In a method that may be considered, the PUSCH timings, minimum values, and/or ranges (i.e., maximum values) configurable of the first PUSCH usage and the third PUSCH usage may be separately configured or defined per usage. As set forth above, PUSCH timing means a time (e.g., a time in slot units) for the UE to transmit the PUSCH and may be denoted a PUSCH timing offset.

At this time, a configuration of the PUSCH timing, minimum value, maximum value, and/or range of the second PUSCH usage may be configured by one of four methods as follows.

Method 1: Sets it to be identical to the configuration for the PUSCH timing of the third PUSCH usage Method 2: Sets it according to information related to the PUSCH timing of the third PUSCH usage Method 3: Sets it separately from the configuration for the PUSCH timings of the first PUSCH usage and the third PUSCH usage Method 4: Sets it in a combination of the configuration for the PUSCH timing of the first PUSCH usage and the PUSCH timing of the third PUSCH usage When the PUSCH is used for CSI feedback usages (i.e., the second PUSCH usage and/or the third PUSCH usage), the PUSCH timing, minimum value, and/or range may be pre-specified according to a specific condition related to the configuration of CSI feedback information or the number of CSI-RS antenna ports or may be configured per CSI reporting setting. Here, when the PUSCH timing, minimum value, and/or range are configured per CSI reporting setting, they may be limited to a value(s) meeting the minimum value requirement according to the above-described condition.

For example, when no PMI is included in the CSI feedback, the slot offset minimum value of the PUSCH timing may be configured to '0.' When a PMI related to the N-port CSI-RS or less is included in the CSI feedback, and no subband PMI is included, the minimum value of the PUSCH timing may be configured to '1.' In contrast, when a PMI related to the N-port CSI-RS or more is included in the CSI feedback, and a subband PMI is included, the minimum value of the PUSCH timing may be configured to '2.'

The configuration related to such condition may be defined over the system or may be transferred from the base station to the UE via a higher layer message. The configuration may mean a configuration for the condition itself and/or PUSCH timing value corresponding to each condition. The base station may select a specific value from among values meeting the minimum value requirement per CSI report configuration and configured it for the UE.

First, when method 1 applies, the UE may receive an indication or configuring of the same PUSCH timing, minimum value, and/or range under the same condition for the second PUSCH usage and the third PUSCH usage.

In contrast, when method 2 applies, the UE may receive an indication or configuring of a difference in PUSCH timing, minimum value, and/or range for the second PUSCH usage and the third PUSCH usage.

For example, the information related to the PUSCH timing of the third PUSCH usage may correspond to, e.g., information about a shift of the PUSCH timing minimum value and/or maximum value configurable, or information about a PUSCH timing value added/deleted. Specifically, the PUSCH timing of the second PUSCH may be configured to a value resultant from adding K slots or symbols (i.e., K slot or symbol delay) to the PUSCH timing of the third PUSCH usage. Or, the PUSCH timing of the second PUSCH may be configured to follow the PUSCH timing of the third PUSCH usage except for where 'timing offset=0.'

The information related to the PUSCH timing of the third PUSCH usage may be configured commonly to the CSI reporting setting or may be configured per set of specific CSI reporting settings.

Unlike this, when method 3 applies, the UE may receive a configuration (or indication) of separate PUSCH timings, minimum values, and/or ranges depending on the three PUSCH usages.

In particular, when method 4 applies, a combination of the configuration for the PUSCH timing of the first PUSCH usage and the configuration for the PUSCH timing of the third PUSCH usage may be defined by one of the following schemes depending on UE capability.

A scheme that may first be considered is to determine that the larger of the minimum Z value and minimum Y value configurable is the minimum value of the PUSCH timing for the second PUSCH usage. For example, when aperiodic CSI reporting and UL data transmission are transmitted together via the PUSCH, the minimum value of the transmission timing of the PUSCH may be configured to the larger of the minimum value of the aperiodic CSI reporting offset and the minimum value of the offset required for UL data transmission.

Additionally, the maximum value of the PUSCH timing of the second PUSCH usage may be determined to be the smaller of the maximum Z value and maximum Y value configurable.

UE belonging to the corresponding scheme may mean a UE capable of performing in parallel encoding processing and CSI computation processing on UL data.

A scheme that may be considered next is to determine that the sum of the minimum Z value and minimum Y value configurable is the minimum value of the PUSCH timing for the second PUSCH usage. For example, when aperiodic CSI reporting and UL data transmission are transmitted together via the PUSCH, the minimum value of the transmission timing of the PUSCH may be configured to the sum of the minimum value of the aperiodic CSI reporting offset and the minimum value of the offset required for UL data transmission.

Additionally, the maximum value of the PUSCH timing of the second PUSCH usage may be determined to be the sum of the maximum Z value and maximum Y value configurable.

UE belonging to the corresponding scheme may mean a UE incapable of performing in parallel (i.e., capable of performing in series) encoding processing and CSI computation processing on UL data.

In this case, the UE may need to report UE capability information, which indicates its processing capability for UL data and/or CSI computation, to the base station.

The above-described scheme considers both the timing offset required for CSI reporting and the timing offset required for UL data transmission, advantageously allowing CSI reporting and UL data transmission to be both performed without any one being dropped.

In the disclosure, the configuration (or definition) of the slot offset of PUSCH timing according to the PUSCH usage described in connection with the embodiments may be commonly applied to the embodiments described below. In other words, in the following embodiments, such an occasion may be assumed where the slot offset of PUSCH timing is configured (or defined) depending on the PUSCH usage.

Second Embodiment

As set forth above, in the case of NR system, a timing offset (e.g., the timing offset Z for transmission of the PUSCH of the first PUSCH usage) for UL data transmission may be dynamically indicated via DCI within a range configured by higher layer signaling.

At this time, although a different mechanism (e.g., MAC-CE) may apply to the second PUSCH usage and the third PUSCH usage, the same signaling mechanism (i.e., a combination of higher layer signaling and DCI) as the first PUSCH usage may be commonly used in a considerable method. This may be efficient given that the PUSCH is the same physical layer channel regardless of usages and that the field of DCI related to the PUSCH timing (i.e., PUSCH transmission timing) may be defined.

Given this, a considerable method is to indicate the PUSCH timing via the same DCI field regardless of usages while separately configuring the PUSCH timing indicated by each DCI code point depending on the usage of the PUSCH. That is, despite the same DCI code point, the target (or content) indicated by the code point may be configured to differ depending on the usage of PUSCH.

Here, the DCI code point may mean a value indicated by the DCI field. As an example, when the DCI field is configured to have two bits, the DCI code point may be one of '00,' '01,' '10,' and '11.'

In this case, a mapping configuration (e.g., a mapping table) between the PUSCH timing and DCI code point according to the PUSCH usage may be pre-defined and fixed over the system, or the mapping configuration may be configured and/or updated via higher layer signaling (e.g., RRC signaling or MAC-CE signaling).

At this time, the mapping configuration for the second PUSCH usage may follow any one of the first PUSCH usage or the third PUSCH usage or may be configured (or indicated) separately.

Table 6 below shows an example mapping table between DCI code point and PUSCH timing depending on PUSCH usages.

TABLE 6

| DCI code point | PUSCH timing offset (usage 1) | PUSCH timing offset (usage 3) |
| --- | --- | --- |
| 00 | Z1 | Y1 |
| 01 | Z2 | Y2 |
| 10 | Z3 | Y3 |
| 11 | Z4 | Y4 |

For example, when a PUSCH of the first PUSCH usage is allocated to the UE, if the code point of the DCI field related to the PUSCH timing received by the UE is '01,' this may mean that the PUSCH timing value for the PUSCH is indicated as 'Z2.' In contrast, when a PUSCH of the third PUSCH usage is allocated to the UE, if the code point of the DCI field related to the PUSCH timing received by the UE is '01,' this may mean that the PUSCH timing value for the PUSCH is indicated as 'Y2.'

Further, in the instant embodiment, a mapping configuration (e.g., where a mapping table is configured by RRC signaling) for the second PUSCH usage and the third PUSCH usage and a range (e.g., where a mapping table is configured by MAC-CE) of PUSCH timing indicatable via the mapping configuration may be configured via higher layer signaling (e.g., RRC signaling) separately per CSI reporting setting.

For example, for the nth CSI reporting setting (CSI reporting setting #n), a range of PUSCH timing values supported for the second PUSCH usage and a range of PUSCH timing values supported for the third PUSCH usage each may be configured. Or, for the nth CSI reporting setting (CSI reporting setting #n), information indicating the relevancy between the PUSCH timing of the second PUSCH usage and the PUSCH timing of the third PUSCH usage may be configured. Here, the information indicating the relevancy may include, e.g., information about a shift of the PUSCH timing minimum value and/or maximum value configurable, or information about a PUSCH timing value added/deleted.

Further, in the instant embodiment, a mapping configuration for the second PUSCH usage and the third PUSCH usage or a range of PUSCH timing indicatable via the mapping configuration may be pre-defined according to a specific condition related to, e.g., the number of CSI-RS antennas, configuration of CSI feedback information.

For example, when in the PUSCH of the third PUSCH usage, no PMI is included in the CSI feedback, three-bit DCI (or three-bit DCI field) indicating PUSCH timing may be configured to indicate PUSCH timing offsets 0 to 7. When in the PUSCH of the third PUSCH usage, a PMI related to N-port CSI-RS or less is included in the CSI feedback and no subband PMI is included, three-bit DCI (or three-bit DCI field) indicating PUSCH timing may be configured to indicate PUSCH timing offsets 1 to 8. When in the PUSCH of the third PUSCH usage, a PMI related to N-port CSI-RS or less is included in the CSI feedback and a subband PMI is included, three-bit DCI (or three-bit DCI field) indicating PUSCH timing may be configured to indicate PUSCH timing offsets 2 to 9.

As another example, when in the PUSCH of the second PUSCH usage, no PMI is included in the CSI feedback, three-bit DCI (or three-bit DCI field) indicating PUSCH timing may be configured to indicate PUSCH timing offsets 1 to 8. When in the PUSCH of the second PUSCH usage, a PMI is included in the CSI feedback, three-bit DCI (or three-bit DCI field) indicating PUSCH timing may be configured to indicate PUSCH timing offsets 2 to 9. As such, a mapping configuration or a range of PUSCH timing indicatable via the mapping configuration may be configured or defined separately depending on the usage of PUSCH and/or the specific condition described above.

Since the method proposed in this embodiment may indicate timings of various PUSCH usages using a common DCI field, DCI overhead may be small and the UE's blind decoding overhead may reduce.

Third Embodiment

In the method described above in connection with the second embodiment, different PUSCH timings (e.g., Y) are indicated in a single DCI field (i.e., a common DCI field regardless of usages) via at least two mapping configurations (e.g., mapping tables).

In contrast, the base station may indicate the PUSCH timing based on a common mapping configuration (e.g., a mapping table) regardless of usages, and, e.g., the PUSCH timing value range may be configured (or defined) to differ depending on each usage. This scheme is described below in greater detail.

Specifically, a considerable method is to indicate the PUSCH timing (i.e., PUSCH transmission timing) via the same DCI field regardless of usages, and the PUSCH timing value indicated by each DCI code point is commonly configured regardless of PUSCH usages.

A PUSCH timing value or range supportable in this case may be configured (or indicated) to differ depending on a specific condition related to each PUSCH usage and/or CSI feedback information configuration, number of CSI-RS antennas (via higher layer signaling) or may be defined as per a specific rule.

At this time, when the UE receives an indication of a PUSCH timing value pre-defined for the indicated PUSCH usage or failing to meet the pre-configured condition, the UE may refrain from transmitting the PUSCH allocated at the timing or using the same for the usage.

Or, in this case, the UE may use the PUSCH for the indicated usage but, instead of CSI information measured based on the indicated CSI-RS, the UE may transmit, e.g., the same information as the latest CSI information reported, CSI information obtained based on the measurement value at (until) the CSI-RS time meeting the CSI timing requirement among CSI-RSs previously received, or a value pre-defined to be transmitted in such a context. For example, the predefined value may include a null value or lowest CQI value. The UE may report occurrence of an error in the PUSCH timing to the base station.

In this embodiment proposed herein, the mapping configuration (e.g., mapping table) between the above-described DCI code point and PUSCH timing may be determined according to a predefined rule. Or, the mapping configuration may be configured or updated by the base station via higher layer signaling (e.g., RRC signaling or MAC-CE).

Further, the UE may use the PUSCH allocated by the base station for a different usage than indicated.

For example, the following assumption is made: although the UE receives an indication that the PUSCH is supposed to be used for the second PUSCH usage, the PUSCH timing value departs off the PUSCH timing value range configured for the second PUSCH usage. In this case, the UE may use the PUSCH resource for the first PUSCH usage (i.e., PUSCH for UL data transmission) without performing CSI reporting (i.e., drop), or the UE may perform CSI reporting via other uplink resource (e.g., PUSCH or PUCCH of other timing).

Specifically, the following assumption is made: although the UE receives an indication of resource allocation information for PUSCH and information for PUSCH timing along with a CSI reporting trigger (or in the same slot), the indicated information fails to meet the requirement of CSI reporting timing (i.e., CSI transmission timing).

In this case, if the UE transmits the PUSCH only for the first PUSCH usage, the CSI information, which is uplink control information, is not piggybacked on the PUSCH, but all PUSCH resources may be used for UL data transmission. When the UE uses the PUSCH for the second PUSCH usage and periodic CSI-RS or semi-static CSI-RS is configured, the UE may transmit CSI information obtained based on the measurement value at (until) the CSI-RS time meeting the requirement of CSI reporting timing. Or, the UE may re-transmit the CSI information reported at a prior timing or may transmit, e.g., a value (e.g., null value or lowest CQI value) predefined to be transmitted in such a context.

Since the method described in this embodiment may indicate timings of each of various PUSCH usages using a common DCI field, the UE's blind decoding overhead may advantageously reduce.

Methods of configuring or indicating PUSCH timings of all the PUSCH usages using a common DCI field have been proposed in the above-described second and third embodiments.

Unlike this, methods of configuring or indicating PUSCH timing using a separate signaling mechanism or separate signaling depending on the PUSCH usage may be considered as in the following embodiments (the fourth to sixth embodiments).

Fourth Embodiment

A first considerable method is to indicate a timing offset (i.e., Z) required for UL data transmission via DCI configured to indicate PUSCH timing and configure a CSI reporting offset value or range (e.g., aperiodic CSI reporting offset, Y) via higher layer signaling.

For example, in a possible configuration, when resource allocation information for PUSCH and triggering of aperiodic CSI reporting are indicated together via DCI, and the two values (i.e., Z as indicated and Y as configured) are identical to each other, the UE may transmit the PUSCH of the indicated timing for the second PUSCH usage. In other words, the UE may perform CSI reporting and UL data transmission via the PUSCH.

Such operation may commonly apply where the indicated Z value is included in the configured Y value. In other words, even when the indicated Z value meets a configured Y value range, the above-described operation may apply likewise.

As another example, in a possible configuration, when resource allocation information for PUSCH and triggering of aperiodic CSI reporting are indicated together via DCI, but the two values are not identical to each other, the UE may transmit the PUSCH of the indicated timing for the first PUSCH usage. In other words, the UE may perform only UL data transmission via the PUSCH.

Or, in this case, the UE may use the PUSCH for the second PUSCH usage but, instead of CSI information measured based on the indicated CSI-RS, the UE may transmit, e.g., the same information as the latest CSI information reported, CSI information obtained based on the measurement value at (until) the CSI-RS time meeting the CSI timing requirement among CSI-RSs previously received, or a value (e.g., null value or lowest CQI value) predefined to be transmitted in such a context.

Such operation may commonly apply where the indicated Z value departs from the configured Y value. In other words, even when the indicated Z value fails to meet a configured Y value range, the above-described operation may apply likewise. For example, the above-described operations may be applied when the indicated timing offset is insufficient to process both CSI reporting and UL data transmission.

At this time, the UE may process CSI reporting indicated by the base station according to any one of methods 1 to 3 as follows.

Method 1

First, the UE may disregard CSI reporting indicated by base station. In other words, the UE may not perform CSI reporting indicated by the base station but may only perform transmission of allocated UL data and/or CSI reporting not indicated.

In this case, the UE may be configured to wait for retransmission of CSI reporting triggering DCI by not resetting but maintaining pre-configured configuration information related to aperiodic CSI reporting via higher layer signaling.

Method 2

Or, the UE may perform CSI reporting indicated by the base station via a PUSCH separately allocated. In other words, the UE may transmit CSI feedback via a PUSCH additionally allocated, instead of the PUSCH previously allocated by the base station.

At this time, the additionally allocated PUSCH may be configured to share the resource allocation information of the previously indicated PUSCH. In this case, the UE may perform UL data transmission and CSI reporting after Z slot and after Y slot, respectively, via the same frequency resource.

Unlike this, resource allocation information for the additionally allocated PUSCH may be configured separately from the resource allocation information of the previously indicated PUSCH. In this case, resource allocation information for CSI reporting may also be indicated via higher layer signaling. Or, a separate field for indicating the resource allocation information for the additionally allocated PUSCH may be configured in the DCI that allocates UL data. Or, the resource allocation information for the additionally allocated PUSCH may be indicated via a separate DCI, rather than the DCI allocating the UL data.

Method 3

Or, the UE may perform CSI reporting indicated by the base station via a PUCCH separately allocated. In other words, the UE may transmit CSI feedback via a PUCCH additionally allocated, instead of the PUSCH previously allocated by the base station.

At this time, when a range of Y is configured via higher layer signaling, the UE may be configured to transmit the PUCCH in the PUCCH resource (or from the PUCCH resource) of the fastest timing among available PUCCH resource(s) within the configured timing offset range.

Unlike this, when one Y value is configured via higher layer signaling, the UE may be configured to transmit the PUCCH in the PUCCH resource (or from the PUCCH resource) of the timing offset. Or, in this case, the UE may also transmit the PUCCH in an available PUCCH resource (or from the PUCCH resource) positioned at the closest timing to the timing offset.

Here, the available PUCCH resource may be determined considering whether the time/frequency/sequence resource of PUCCH is sufficient to transmit the CSI report, as well as whether there is a PUCCH resource configured (or allocated) in the slot. In this case, it may also be considered whether it is sufficient to transmit the CSI report at once or number of times.

At this time, whether the allocated PUCCH resource is sufficient to send out a specific CSI report may be determined by the relationship of format or type (e.g., short PUCCH and PUCCH), PUCCH resource supported depending on, e.g., the UCI coding rate, or configuration and information quantity of CSI feedback. In this case, the relationship information may be specified over the system or be configured by the base station via higher layer signaling.

When the available PUCCH resource is insufficient to transmit CSI reporting information at once, the UE may transmit the CSI reporting information via multiple PUCCH resources. At this time, the multiple PUCCH resources may be configured according to consecutive slots or a pre-configured (or pre-defined) period. In this case, whether the above-described condition is met may also be considered to configure the multiple PUCCH resources.

Since in the method described in connection with this embodiment, whether the UE performs UL data transmission and CSI reporting considering Z and Y, the UE's overhead related to PUCCH transmission may reduce, and any one of CSI reporting and UL data transmission may be prevented from dropping unintentionally.

Fifth Embodiment

Unlike described above, the offset (i.e., Z) required for UL data transmission and aperiodic CSI reporting offset (i.e., Y) for configuring PUSCH timing each may be indicated via DCI, and resource allocation information for the PUCCH related thereto may be shared or indicated separately.

Specifically, when resource allocation information for PUSCH is shared for UL data transmission and CSI reporting, the UE may perform UL data transmission and CSI reporting via the same frequency resource after Z slot and after Y slot.

Alternatively, when resource allocation information for PUSCH for UL data transmission and CSI reporting is separately indicated, the UE may transmit UL data after Z slot in the frequency resource indicated by the resource allocation information of PUSCH for UL data transmission. The UE may transmit UL data after Z slot in the frequency resource indicated by the value of the resource allocation information of PUSCH for CSI reporting.

Alternatively, when Z and Y indicated via DCI are the same or one of them is missing, the UE may simultaneously perform CSI reporting and UL data transmission in one PUSCH. In other words, in such a case, the UE may be configured to transmit the PUSCH of the second PUSCH usage.

Sixth Embodiment

Unlike described above, the offset (i.e., Z) required for UL data transmission and aperiodic CSI reporting offset (i.e., Y) for configuring PUSCH timing each may be indicated via DCI, and only one piece of resource allocation information for the PUCCH related thereto may be indicated.

Specifically, when the indicated Z and Y values are identical to each other, one of them is missing, or Z is larger than Y, the UE may be configured to perform CSI reporting and UL data transmission via the PUSCH resource indicated by the resource allocation field in the slot corresponding to Z. In this case, the PUSCH for CSI reporting and UL data transmission may correspond to the second PUSCH usage.

Unlike this, if Z and Y as indicated differ from each other, or Z is smaller than Y, the UE may transmit UL data via the PUSCH resource indicated by the resource allocation field in the slot corresponding to Z while performing CSI reporting via the PUSCH resource in the slot corresponding to Y. Here, the PUSCH resource where the UE performs CSI reporting may be configured via higher layer signaling or may be indicated by the resource allocation field.

Further, only when a pre-defined (or pre-configured) requirement in relation to the CSI reporting offset is met all the time, the base station may indicate CSI reporting along with the frequency resource and time resource of PUSCH. At this time, the frequency resource may be indicated via resource allocation information, and the time resource may be indicated via timing offset.

In this case, since the UE may always use a guaranteed CSI computation time, the UE may be configured not to be indicated or expected to receive a CSI reporting indication departing off the CSI reporting timing offset predefined (or pre-configured). In other words, when the UE performs CSI reporting via the PUSCH or PUCCH, the UE may be configured not to expect to receive a CSI reporting indication within a time shorter than the pre-configured CSI reporting timing offset.

This may also apply to periodic CSI reporting and/or CSI reporting. Of course, this is also applicable to CSI reporting via PUCCH not only via PUSCH.

According to embodiments of the disclosure, the UE may advantageously secure a sufficient computation time upon performing CSI reporting and UL data transmission.

Figure 10:
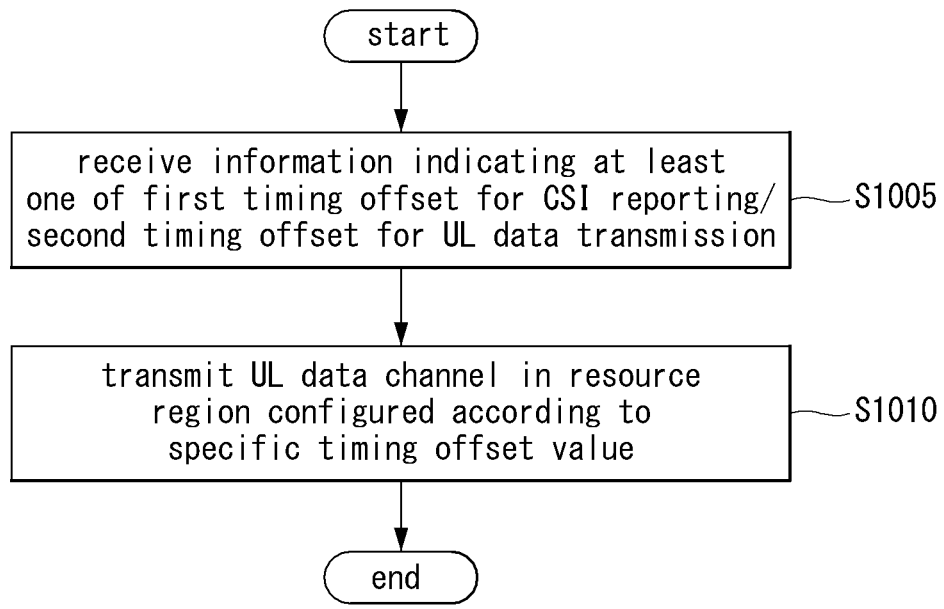
FIG. 10 is a flowchart illustrating operations of a UE transmitting an uplink channel in a wireless communication system to which a method as proposed according to the disclosure is applicable.

FIG. 10 is a flowchart illustrating operations of a UE transmitting an uplink channel in a wireless communication system to which a method as proposed according to the disclosure is applicable. FIG. 10 is intended merely for illustration purposes but not for limiting the scope of the disclosure.

Referring to FIG. 10, it is assumed that the UE transmits a PUSCH channel according to a method as described above in connection with the embodiments. However, the scheme described in connection with FIG. 10 may apply not only to PUSCH but also to the PUCCH transmission. In the case of FIG. 10, it is assumed that the UE receives an allocation (or indication) of CSI reporting and/or UL data transmission from the base station. Further, CSI reporting of FIG. 10 may be the above-described aperiodic CSI reporting.

First, the UE may receive information indicating at least one of a first timing offset (e.g., the above-described CSI reporting offset, Y) for CSI reporting and a second timing offset (e.g., the above-described offset required for UL data transmission, Z) for UL data transmission from the base station (S1005).

For example, as in the above-described methods, the first timing offset and the second timing offset may be indicated in the same field of DCI. In other words, Y and Z may be indicated by the same field of the same DCI (i.e., the same DCI format).

At this time, the code point of the field may indicate one of candidate values for the first timing offset or one of candidate values for the second timing offset, according to the type of information allocated to the uplink data channel. In this case, each of the candidate values of the first timing offset and the candidate values for the second timing offset may be configured via higher layer signaling. For example, when the CSI report and uplink data are allocated to the uplink data channel (i.e., when the second PUSCH usage (or purpose) is indicated from the base station), the code point of the field may be mapped to one of the candidate values for the first timing offset or one of the candidate values for the second timing offset.

Next, in a resource region (e.g., a slot and/or symbol) configured according to a specific timing offset, the UE may transmit the uplink data channel (e.g., PUSCH) to the base station (S1010). Here, the specific timing offset may be configured applying at least one of the first timing offset and the second timing offset, according to the type of information allocated to the uplink data channel.

As set forth above, types of information allocated to the uplink data channel may be divided into a first type (e.g., the above-described third PUSCH usage) in which the CSI report is allocated, a second type (e.g., the above-described second PUSCH usage) in which the CSI report and uplink data are allocated, and a third type (e.g., the above-described first PUSCH usage) in which the uplink data is allocated.

At this time, as described above, a minimum timing offset value for transmission of uplink data channel may be configured per type.

In particular, when the CSI report and uplink data are allocated to the uplink data channel as an example, the minimum timing offset value may be determined by adding a specific value (e.g., 2 or 3) to the minimum timing offset value for the above-described first type. At this time, when the above-described specific timing offset value fails to meet the minimum timing offset value for the uplink data channel allocated to the UE, the UE may operate as follow. When the specific timing offset value is configured to be smaller than the minimum timing offset value, CSI reporting may not be performed via uplink data channel. Or, when the specific timing offset value is smaller than the minimum timing offset value and is larger than the minimum timing offset value for the third type, only uplink data may be transferred via the uplink data channel. Or, when the specific timing offset value is smaller than the minimum timing offset value, the CSI previously reported by the UE may be transferred via the uplink data channel.

Further, the first timing offset may be configured via higher layer signaling, and the second timing offset may be indicated by downlink control information (e.g., the above-described fourth embodiment). At this time, when resource allocation of uplink data channel and triggering of CSI reporting are simultaneously indicated and the range indicated by the second timing offset is included in the range indicated by the first timing offset, the uplink data channel may be configured to transfer the CSI report and uplink data. Or, when resource allocation of uplink data channel and triggering of CSI reporting are simultaneously indicated and the range indicated by the second timing offset is not included in the range indicated by the first timing offset, the uplink data channel may be configured to transfer uplink data.

Overview of Devices to which the Present Disclosure May be Applied

Figure 11:
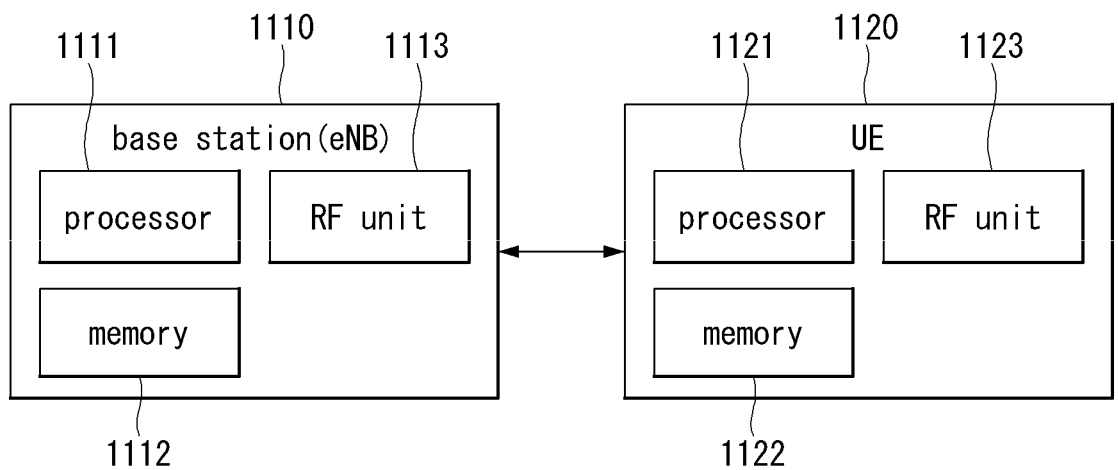
FIG. 11 is a block diagram illustrating a configuration of a wireless communication device according to an embodiment of the disclosure.

FIG. 11 illustrates a block diagram of a wireless communication device according to an embodiment of the present disclosure.

Referring to FIG. 11, a wireless communication system includes a base station (or network) 1110 and a UE 1120.

The base station 1110 includes a processor 1111, a memory 1112, and a communication module 1113.

The processor 1111 implements a function, a process, and/or a method which are proposed in FIGS. 1 to 10 above. Layers of a wired/wireless interface protocol may be implemented by the processor 1111. The memory 1112 is connected with the processor 1111 to store various pieces of information for driving the processor 1111. The communication module 1113 is connected with the processor 1111 to transmit and/or receive a wired/wireless signal.

The communication module 1113 may include a radio frequency (RF) unit for transmitting/receiving a radio signal.

The UE 1120 includes a processor 1121, a memory 1122, and a communication module (or RF unit) 1123. The processor 1121 implements a function, a process, and/or a method which are proposed in FIGS. 1 to 10 above. The layers of the wireless interface protocol may be implemented by the processor 1121. The memory 1122 is connected with the processor 1121 to store various pieces of information for driving the processor 1121. The communication module 1123 is connected with the processor 1121 to transmit and/or receive the wireless signal.

The memories 1112 and 1122 may be positioned inside or outside the processors 1111 and 1121 and connected with the processors 1111 and 1121 by various well-known means.

Further, the base station 1110 and/or the UE 1120 may have a single antenna or multiple antennas.

Figure 12:
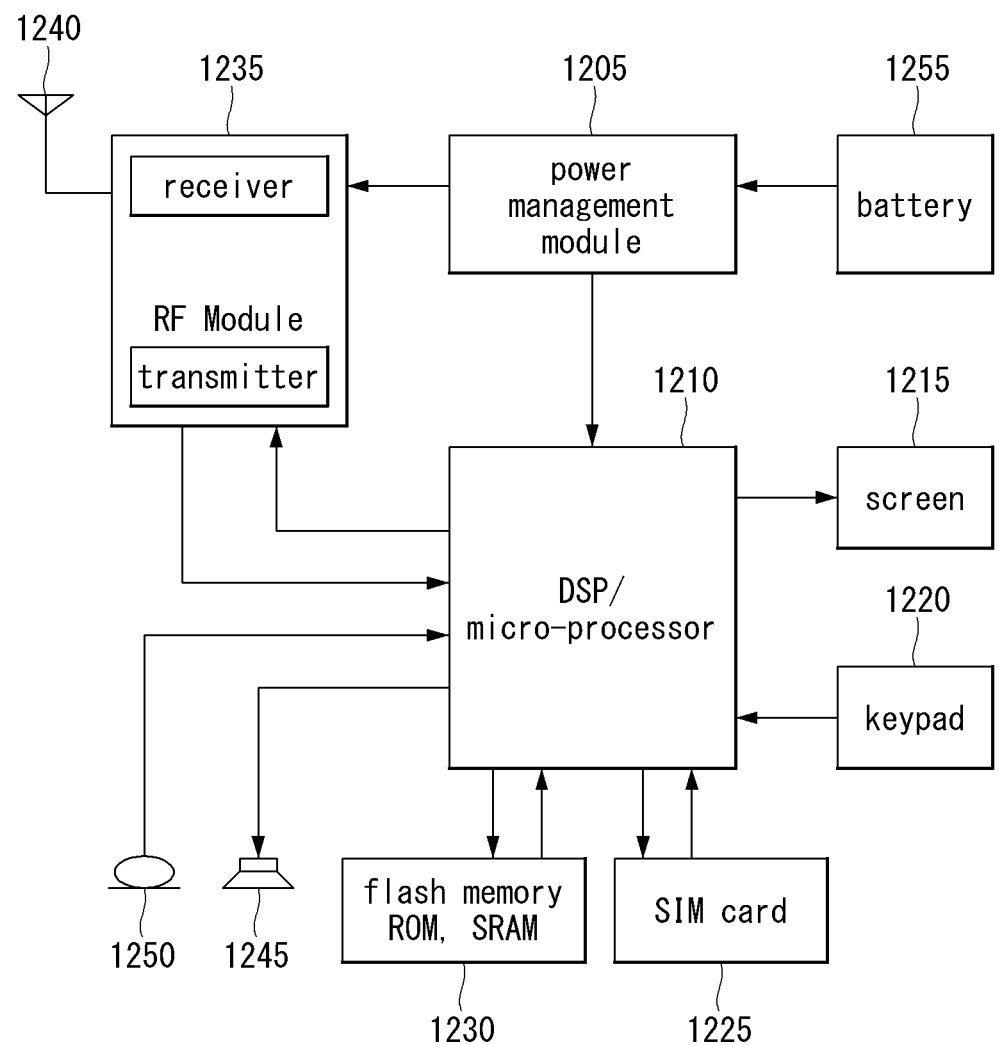
FIG. 12 is a block diagram illustrating a configuration of a communication device according to an embodiment of the disclosure.

FIG. 12 illustrates a block diagram of a communication device according to an embodiment of the present disclosure.

In particular, FIG. 12 is a diagram more specifically illustrating the UE of FIG. 11.

Referring to FIG. 12, the UE may be configured to include a processor (or a digital signal processor (DSP) 1210, an RF module (or RF unit) 1235, a power management module 1205, an antenna 1240, a battery 1255, a display 1215, a keypad 1220, a memory 1230, a subscriber identification module (SIM) card 1225 (this component is optional), a speaker 1245, and a microphone 1250. The UE may also include a single antenna or multiple antennas.

The processor 1210 implements a function, a process, and/or a method which are proposed in FIGS. 1 to 10 above. Layers of a wireless interface protocol may be implemented by the processor 1210.

The memory 1230 is connected with the processor 1210 to store information related to an operation of the processor 1210. The memory 1230 may be positioned inside or outside the processor 1210 and connected with the processor 1210 by various well-known means.

A user inputs command information such as a telephone number or the like by, for example, pressing (or touching) a button on the keypad 1220 or by voice activation using the microphone 1250. The processor 1210 receives such command information and processes to perform appropriate functions including dialing a telephone number. Operational data may be extracted from the SIM card 1225 or the memory 1230. In addition, the processor 1210 may display command information or drive information on the display 1215 for the user to recognize and for convenience.

The RF module 1235 is connected with the processor 1210 to transmit and/or receive an RF signal. The processor 1210 transfers the command information to the RF module 1235 to initiate communication, for example, to transmit radio signals constituting voice communication data. The RF module 1235 is constituted by a receiver and a transmitter for receiving and transmitting the radio signals. The antenna 1240 functions to transmit and receive the radio signals. Upon receiving the radio signals, the RF module 1235 may transfer the signal for processing by the processor 1210 and convert the signal to a baseband. The processed signal may be converted into to audible or readable information output via the speaker 1245.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

INDUSTRIAL AVAILABILITY

Although the uplink channel transmission/reception methods in a wireless communication system have been described in connection with examples in which they apply to 3GPP LTE/LTE-A systems, and 5G systems, the methods are also applicable to other various wireless communication systems.

The invention claimed is:

1. A method of transmitting an uplink channel by a user equipment (UE) in a wireless communication system, the method comprising:
   receiving, from a base station, downlink control information including a code point mapped to one of candidate values for a timing offset value for transmission of an uplink data channel to which at least one of channel state information (CSI) reporting or transmission of uplink data is allocated; and
   transmitting the uplink data channel to the base station, based on the timing offset value determined by the code point included in the downlink control information,
   wherein the candidate values for the timing offset value are configured based on types of allocation in which the uplink data and the CSI reporting are allocated to the uplink data channel.

2. The method of claim 1, wherein the types of allocation in which the uplink data and the CSI reporting are allocated to the uplink data channel comprises at least one of i) a first type in which only the CSI reporting is allocated to the uplink data channel, ii) a second type in which both the CSI reporting and the uplink data are allocated to the uplink data channel, and iii) a third type in which only the uplink data is allocated to the uplink data channel.

3. The method of claim 2, wherein at least one mapping configuration between (i) values of the code point of the specific field and (ii) the candidate values for the timing offset value is configured for each of at least one of the first type, the second type or the third type.

4. The method of claim 3, wherein, a minimum timing offset value for a transmission of the uplink data channel related to the second type is determined by adding a specific value to a minimum timing offset value for a transmission of the uplink data channel related to the first type.

5. The method of claim 4, wherein, based on i) a mapping configuration configured for the second type and ii) the timing offset value that is configured to be smaller than the minimum timing offset value for the transmission of the uplink data channel related to the second type,
   the CSI reporting is not performed via the uplink data channel.

6. The method of claim 4, wherein, based on i) a mapping configuration configured for the second type, ii) the timing offset value that is smaller than the minimum timing offset value for the transmission of the uplink data channel related to the second type and iii) the timing offset value that is larger than a minimum timing offset value for a transmission of the uplink data channel related to the third type,
   the uplink data is only transmitted via the uplink data channel.

7. The method of claim 4, wherein, based on i) a mapping configuration configured for the second type and ii) the timing offset value that is smaller than the minimum timing offset value for the transmission of the uplink data channel related to the second type,
   a CSI previously reported by the UE is transmitted via the uplink data channel.

8. The method of claim 3, wherein the at least one mapping configuration is configured for each of the first type and the third type,
   wherein the timing offset value is determined based on a mapping configuration configured for the first type based on that only the CSI reporting is allocated to the uplink data channel, and
   wherein the timing offset value is determined based on a mapping configuration configured for the third type based on that only the uplink data is allocated to the uplink data channel.

9. The method of claim 8, wherein a mapping configuration for the second type is same with the mapping configuration for the third type.

10. The method of claim 3, wherein the at least one mapping configuration is configured for each of the first type, the second type and the third type,
    wherein the timing offset value is determined based on a mapping configuration configured for the first type based on that only the CSI reporting is allocated to the uplink data channel, and
    wherein the timing offset value is determined based on a mapping configuration configured for the second type based on that both the uplink data and the CSI reporting are allocated to the uplink data channel, and
    wherein the timing offset value is determined based on a mapping configuration configured for the third type based on that only the uplink data is allocated to the uplink data channel.

11. The method of claim 3, wherein each of a mapping configuration for the first type, a mapping configuration for the second type and the mapping configuration for the third type, is configured via higher layer signaling.

12. A user equipment (UE) configured to transmit an uplink channel in a wireless communication system, the UE comprising:
    a transceiver for transmitting and receiving a radio signal;
    at least one processor; and at least one memory operatively coupled to the at least one processor and storing instructions that, when executed by the at least one processor, control the UE to:

receive, from a base station, downlink control information including a code point mapped to one of candidate values for a timing offset value for transmission of an uplink data channel to which at least one of channel state information (CSI) reporting or transmission of uplink data is allocated; and transmit the uplink data channel to the base station, based on the timing offset value determined by the code point included in the downlink control information, wherein the candidate values for the timing offset value are configured based on types of allocation in which the uplink data and the CSI reporting are allocated to the uplink data channel.

13. An apparatus configured to transmit an uplink channel in a wireless communication system, the apparatus comprising:

at least one processor; and at least one memory operatively coupled to the at least one processor and storing instructions that, when executed by the at least one processor, performs operations comprising:

receiving, from a base station, downlink control information including a code point mapped to one of candidate values for a timing offset value for transmission of an uplink data channel to which at least one of channel state information (CSI) reporting or transmission of uplink data is allocated; and transmitting the uplink data channel to the base station, based on the timing offset value determined by the code point included in the downlink control information, wherein the candidate values for the timing offset value are configured based on types of allocation in which the uplink data and the CSI reporting are allocated to the uplink data channel.

* * * * *